United States Patent
Komatsu et al.

(10) Patent No.: US 7,688,511 B2
(45) Date of Patent: Mar. 30, 2010

(54) DIFFRACTION TYPE LIGHT-CONDENSING FILM AND PLANAR LIGHT SOURCE DEVICE USING THE SAME

(75) Inventors: Tokutaro Komatsu, Abiko (JP); Yasuhiko Awano, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 497 days.

(21) Appl. No.: 11/572,528

(22) PCT Filed: Mar. 24, 2005

(86) PCT No.: PCT/JP2005/005415

§ 371 (c)(1),
(2), (4) Date: Jan. 23, 2007

(87) PCT Pub. No.: WO2006/011268

PCT Pub. Date: Feb. 2, 2006

(65) Prior Publication Data

US 2007/0211342 A1    Sep. 13, 2007

(30) Foreign Application Priority Data

Jul. 23, 2004    (JP) .............................. 2004-215548

(51) Int. Cl.
G02B 5/18    (2006.01)
G02B 27/44    (2006.01)
(52) U.S. Cl. ...................... 359/566; 359/565; 359/571
(58) Field of Classification Search ................ 359/566, 359/565, 571
See application file for complete search history.

(56) References Cited

U.S. PATENT DOCUMENTS

2005/0254129 A1 * 11/2005 Clark et al. ................. 359/573

FOREIGN PATENT DOCUMENTS

| JP | 05-307174 | 11/1993 |
| JP | 06-059257 | 3/1994 |
| JP | 06-109925 | 4/1994 |

(Continued)

OTHER PUBLICATIONS

Victor Soifer et al., Iterative Methods for Diffractive Optical Elements Computation, Taylor & Francis, pp. 1-10, 1997.

(Continued)

*Primary Examiner*—Joshua L Pritchett
(74) *Attorney, Agent, or Firm*—Antonelli, Terry, Stout & Kraus, LLP.

(57) ABSTRACT

Provided are an easy-to-handle thin diffraction type light-condensing film exhibiting high light transmissivity and condensation ability, and a planar light source device using the film. A hologram optical element using diffraction/interference phenomena based on wave properties of light is used instead of a conventional prism sheet using refraction. As a result, the diffraction type light-condensing film and the planar light source device have high light transmissivity and are thin. In the diffraction type light-condensing film, dependence of bending angle on wave length is low and light entering from an oblique direction is bent in the vertical direction and emitted with spectral separation of white light suppressed. High light-condensation impossible in a conventional optical element is realized by suppressing angular variation in emission light for angular variation in incident light.

17 Claims, 33 Drawing Sheets

FOREIGN PATENT DOCUMENTS

| | | |
|---|---|---|
| JP | 06-294955 | 10/1994 |
| JP | 07-028047 | 1/1995 |
| JP | 07-049490 | 2/1995 |
| JP | 07-114015 | 5/1995 |
| JP | 09-113730 | 5/1997 |
| JP | 09-325218 | 12/1997 |
| JP | 10-030110 | 2/1998 |
| JP | 10-506500 | 6/1998 |
| JP | 10-301110 | 11/1998 |
| JP | 11-296054 | 10/1999 |
| JP | 2000-039515 | 2/2000 |
| JP | 2002-352611 | 12/2002 |
| WO | WO 96/10148 | 4/1996 |

OTHER PUBLICATIONS

Chinese Official Action for Application No. 2005800246956, dated Feb. 29, 2008.

Chinese Official Action for Application No. 2005800246956, dated Jul. 25, 2008.

\* cited by examiner

DIFFRACTION TYPE LIGHT-CONDENSING FILM AND PLANAR LIGHT SOURCE DEVICE USING THE SAME

TECHNICAL FIELD

The present invention relates to a diffraction type light-condensing film for bending oblique incident white light to a vertical direction and outputting the bent light and a planar light source device using the same. In particular, the present invention is applicable to a backlight of a liquid crystal display, to improve the brightness of the display in the direction of an observer.

BACKGROUND TECHNOLOGY

Liquid crystal displays (LCDs) are used as display parts of computers, display parts of control panels of home appliances, and display parts of cellular phones and are required to further reduce power consumption, weight, and thickness.

The liquid crystal display is not a self-luminous device, and therefore, must have an external light source or environmental external light. The typical external light source is a backlight, which is a planar light source placed behind an LCD panel. The backlight is required to emit the outgoing light in the direction of an observer.

A typical configuration of a LCD panel with the side-incidence-type backlight is shown in FIG. 1. A light source 90 emits light, which is made incident on the side edge of a light guide 12, which obliquely emits light 14. The light 14 is bent with an optical sheet, typically a prism sheet 91 to the direction normal to the sheet plane and is diffused with a diffuser 32 so as to reduce chromatic dispersion and irradiate a liquid crystal panel 30 that displays an image. The shape of the light guide and the shape of the prism sheet 91 arranged between the light guide and the liquid crystal panel are optimized to increase the brightness in the normal direction.

In the vicinity of the light-entering part of a side-incidence backlight, the uniformity of the brightness is so inferior as to deteriorate the quality of the image displayed on the LCD panel placed over the backlight. Due to the low uniformity, the region within a certain distance from the light-entering part must be reserved as an undisplayed area, which hinders the miniaturization of LCD's. It is difficult for conventional prism sheets to simultaneously realize high brightness and high brightness uniformity. For example, by adding a diffusing structure to a prism sheet, the brightness uniformity can be improved, while the brightness is spoiled.

An output angle $\theta_o$ of light from the light guide is dependent on the design of the light guide. An incidence angle $\theta_i$ is usually 20° to 70°. The role of the prism sheet 91 is to efficiently bend the light to a direction where $\theta_o$ is 0°, i.e., the normal direction. For this, it is necessary to reduce Fresnel reflection that is interfacial reflection between an air layer and the prism sheet and make as much light as possible advance in the direction of 0°. As the emission from usual light guides has some angular distribution, it is favorable that the emission angle $\theta_o$ of an optical sheet changes smaller than the incident angle $\theta_i$. Such an optical sheet can maintain higher brightness in the normal direction than the one with a fixed light-bending angle. Light from the light source is white light, and therefore, it is necessary to reduce the wavelength dependence of bend angle and minimize dispersion. The dispersion deteriorates the color reproduction of liquid crystals to degrade display quality.

The conventional prism sheet bends light by utilizing the characteristics of macroscopic optical parts, which function according to geometric-optical laws, such as refraction and total-internal reflection. With the macroscopic geometry, geometric-optical sheets, including the prism sheet, cannot help remaining thick. Thus, the prism sheet is an obstacle in the attempt to make thinner backlight. As each prism in the prism sheet independently functions to bend light, and defect or foreign matter in the prism results in an anomalous scattering of the light that passes through the prism. Anomalous stray rays can easily be recognized as some flaw in the display, for example, a bright spot. A display is sensitive to the defect or foreign matter and causes a display abnormity, to deteriorate product quality. To avoid the prism defect or foreign matter, the conventional prism sheet needs careful handling and manufacturing.

Compared with an element using the geometrical optical effect, an optical element (hologram optical element) using a diffraction/interference phenomenon based on wave optics has advantages that it can be thinned and that a plurality of functions such as condensing and diffusing can be realized with a single element. The hologram-optical elements known to date involve dispersion and high-order diffraction, and therefore, has been used not for bending white light but for diffusing white light to expand a viewing angle (refer to Japanese Patent Application Laid-Open Publication No. 7-114015 (page 1-2, representative drawing), Japanese Patent Application Laid-Open Publication No. 9-325218 (page 1-2, representative drawing), Japanese Patent Application Laid-Open Publication No. 10-506500 (page 1-4, FIG. 1-5), Japanese Patent Application Laid-Open Publication No. 11-296054 (page 1-2, FIG. 2-5), and Japanese Patent Application Laid-Open Publication No. 2000-39515 (page 1-2, FIG. 1-2)) and for separating white light (Japanese Patent Application Laid-Open Publication No. 9-113730 (page 1-5, representative drawing) and Japanese Patent Application Laid-Open Publication No. 10-301110 (page 1-2, FIG. 68). The effect of diffusing white light has been used for making dot-matrix display defects invisible (refer to Japanese Patent Application Laid-Open Publication No. 5-307174 (page 1-2, representative drawing), Japanese Patent Application Laid-Open Publication No. 6-59257 (page 1-2, representative drawing), Japanese Patent Application Laid-Open Publication No. 6-294955 (page 1-2, representative drawing), Japanese Patent Application Laid-Open Publication No. 7-28047 (page 1-2, representative drawing), and Japanese Patent Application Laid-Open Publication No. 7-49490 (page 1-2, representative drawing)). A method of designing a hologram optical element is described in, for example, Victor Soifer, Victor Kotlyar, and Leonid Doskolovich, "Iterative Methods for Diffractive Optical Elements Computation," U.S.A., Taylor & Francis, 1997, p. 1-10.

Such a hologram optical element using the diffraction/interference phenomenon based on wave optics has problems of 1) producing diffracted light of orders of diffraction other than that at which incident light is vertically diffracted, 2) lowering the diffraction efficiency of the required order of diffraction, and 3) causing large wavelength dispersion. For example, if a period is small, there will be no order of diffraction for vertical diffraction or wavelength dispersion will be large. If a depth is improper, the diffraction efficiency of the required order of diffraction will be low.

SUMMARY OF THE INVENTION

There is provided a diffraction type light-condensing film that is thin, has a high light transmittance and light-condensing ability, and is easy to handle, as well as a planar light source device using the same.

An object of the present invention is to use, instead of a conventional prism sheet using refraction, a hologram optical element using a diffraction/interference phenomenon based on a wave-like characteristic of light and provide a diffraction type light-condensing film that simultaneously realizes increasing a transmittance of the film and thinning the film, as well as a planar light source device using the same.

A diffraction type light-condensing film according to the present invention bends white light with oblique incident angle in the normal direction of the firm surface, has small wavelength dependence of the bending angle, suppresses the dispersion of the light, and emits the light as white light. At the same time, the film minimizes a change in the angle of the output light with respect to a change in the angle of incident light, to realize a high light-condensing ability that is unachievable with a conventional optical element.

A transmission diffraction grating according to the present invention is a diffraction grating having a film, or a plate shape. The diffraction grating has an incidence surface to receive incident light and an output surface to transmit and output the light incident on the incidence surface. The incidence surface has fine grating grooves that are parallel to one another and form a sawteeth sectional shape. When receiving white light having CIE color coordinates of x=0.310 and y=0.316, the diffraction grating provides output light having a CIE color coordinate x of $0.31 \leq x \leq 0.37$ and a color coordinate y of $0.3 \leq y \leq 0.42$. Namely, the diffraction grating bends white light obliquely made incident to the diffraction grating to a vertical direction with suppressed dispersion and outputs the bent light. A normal of one of the slopes of a sawtooth forms an angle $\alpha_F$ with a normal of the top surface of the film or plate so that the angle $\alpha_F$ is equal to or larger than 70 degrees and equal to or smaller than 89.5 degrees. At the same time, a normal of the other slope forms an angle $\alpha_B$ with respect to the normal of the top surface of the film or plate to satisfy $\theta_i/2.69-5 \leq 78-\alpha_B \leq \theta_i/2.26+5$, where $\theta_i$ is an angle formed between incident light and the normal of the top surface of the film or plate.

It is preferable that $\alpha_F$ is equal to or larger than 73° and equal to or smaller than 81°.

It is preferable that a pitch is equal to or smaller than 10 μm.

It is preferable that the pitch is equal to or larger than 1 μm and equal to or smaller than 5 μm.

It is preferable that the grating has a sectional shape approximated to steps of N levels (N=4, 5, 6, 7, 8, . . . ).

It is preferable that the grating grooves are formed in circular arcs.

It is preferable to have, with $m_1, m_2 = 1, 2, 3, \ldots$, a sawteeth shape having an average period d of $m_1 \times (6.0 \pm 2.0)$ μm and an average depth h of $m_2 \times (5.0 \pm 1.0)$ μm, or a surface shape with the sawteeth shape approximated by N levels (N=4, 5, 6, 7, 8, . . . ).

It is preferable that a film having a function of preventing polarization split, color separation, or reflection is arranged adjacent to the transmission diffraction grating, or on the front and back sides of a hologram optical element.

It is preferable that the function of preventing polarization split, color separation, or reflection is provided by a relief grating having a period equal to or smaller than 0.6 μm and a depth equal to or smaller than 0.5 μm.

A planar light source device according to the present invention is characterized in that the above-mentioned transmission diffraction grating is arranged on a light output surface of a planar light source.

It is preferable that, if no transmission diffraction grating is arranged, light is output in an angular range of 20° to 70° with respect to a normal direction of the light output surface of the planar light source, and if a hologram optical element serving as a transmission diffraction grating is arranged, 60% or over of whole output light from the planar light source is emitted in an angular range of −10° to +10° with respect to the normal direction of the light output surface of the planar light source.

It is preferable to use a diffuser in addition to the hologram optical element.

It is preferable that the diffuser is a hologram diffuser to limitedly diffuse incident light into a specific angular range in a space.

It is preferable that the hologram diffuser is integrally formed on a light output surface of a light guide.

It is preferable to arrange a reflection preventive film on the light output surface of the hologram optical element.

It is preferable to also arrange a film for polarization or wavelength selection.

It is preferable that a light source of the planar light source is arranged in contact with a side end face of the light guide and a plurality of grooves are formed on the back surface of the light guide substantially orthogonal to a light propagating direction of the light guide.

The diffraction type light-condensing film according to the present invention realizes a high light-condensing ability because a change in an output angle is small relative to a change in an incidence angle. In addition, the influence of an incident light distribution on an output characteristic is small, and therefore, front brightness is high irrespective of the characteristics of a light guide used in combination with the light-condensing film.

PREFERRED EMBODIMENTS OF THE INVENTION

Figure 1:
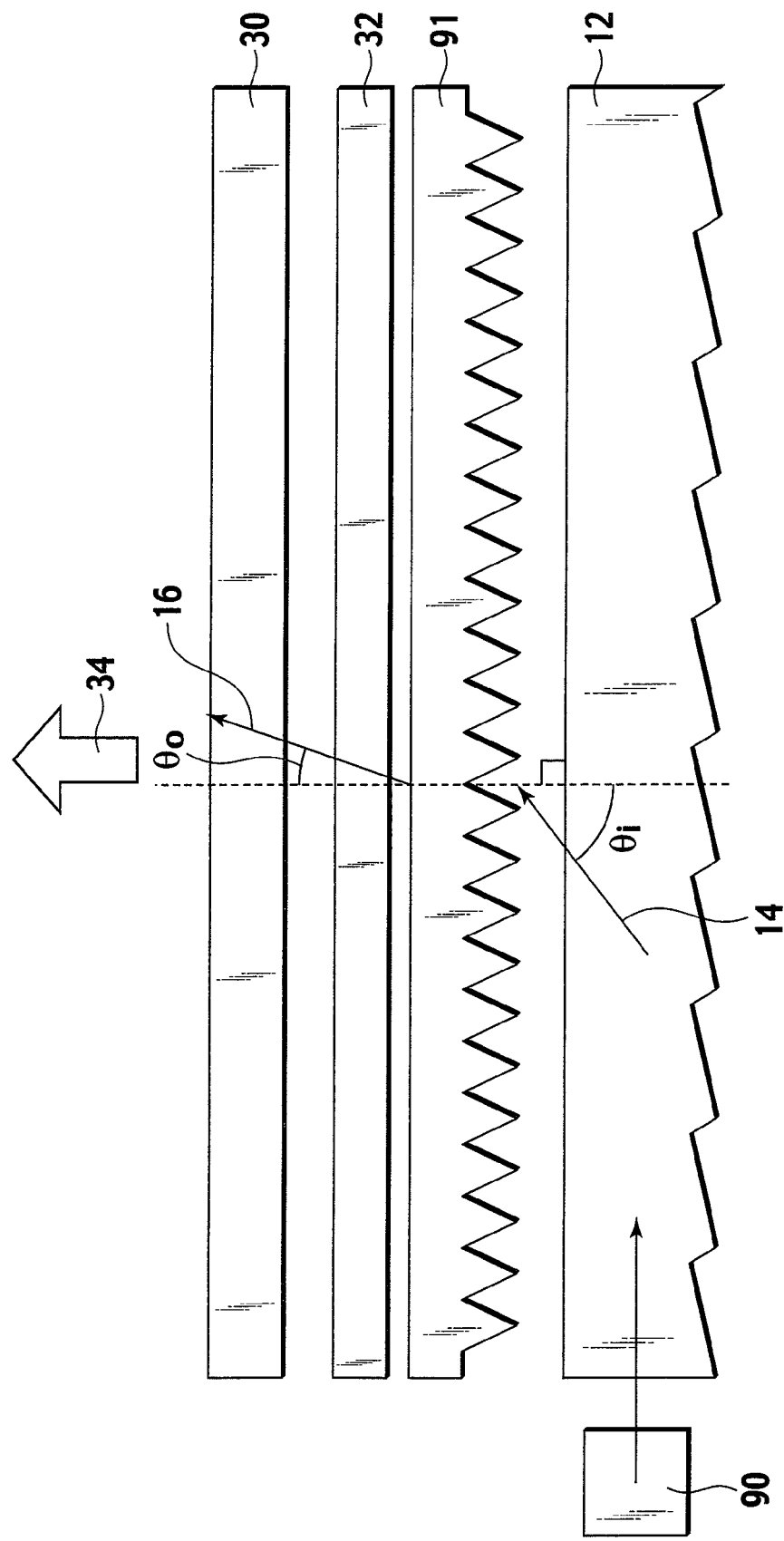
FIG. 1 is a view showing a typical configuration of a backlight liquid crystal display.

Embodiments of a diffraction type light-condensing film and a planar light source device employing the same will be explained with reference to the accompanying drawings. These embodiments do not limit configurations of the present invention.

A diffraction type light-condensing film according to the present invention bends white light with oblique incident angle in the normal direction of the film surface, has small wavelength dependence of the bending angle, suppresses the dispersion of the light, and emits the light as white light. Generally, a hologram optical element including a diffraction grating controls output light by multiple interferences of diffracted light transmitted through many microstructures. Accordingly, a loss of one microstructure or the presence of foreign matter hardly influences output light. Namely, it has excellent redundancy. The hologram optical element, therefore, is easier in handling and processing than conventional prism sheets. Using the hologram optical element enables not only a bending function but also other light controlling functions including a light-condensing function. Methods of designing the hologram optical element are described in the documents of Victor Soifer and others mentioned above.

A diffraction grating, which is an example of the hologram optical element, can generally improve diffraction efficacy when it has a sawteeth sectional shape. By optimizing the shape, the grating can bend white light with suppressed dispersion or diffusion. When monochromatic light is passed through a standard diffraction grating, diffraction occurs several times to produce first-order light, second-order light, and the like, so that light is propagated at the respective diffraction angles, to cause a problem of deteriorating light bending efficacy. When white light is bent by diffraction, diffraction angles generally differ depending on wavelengths, to cause a problem of color dispersion. However, a proper design of the diffraction grating can suppress dispersion or the deterioration of light bending efficacy. Here, the hologram optical element generally means an optical element employing a diffraction/interference phenomenon based on wave optics. The diffraction type light-condensing film is an optical element that uses an effect specific to the hologram optical element, to realize light deflecting and condensing functions. The white light means light containing blue, green, and red colors, i.e., three primary colors. Bending in a vertical direction means changing the direction of light that is obliquely made incident to the surface of an optical element having diffraction and interference effects to the direction of a normal of the surface and outputting the direction-changed light.

Among the above-mentioned diffraction type light-condensing films, a diffraction type light-condensing film according to a first embodiment is a transmission diffraction grating. Sufficiently collimated light close to parallel light of three wavelengths $\lambda_1$, $\lambda_2$, and $\lambda_3$ in the ranges of $0.46 \leq \lambda_1 \leq 0.50$ μm (blue light), $0.53 \leq \lambda_2 \leq 0.57$ μm (green light), and $0.60 \leq \lambda_3 \leq 0.64$ μm (red light), for example, $\lambda_1=0.48$ μm, $\lambda_2=0.55$ μm, and $\lambda_3=0.62$ μm is made incident to the film at an angle of $\theta_i$. Then, the film realizes that a diffraction angle at which the diffraction efficiency of each wavelength is maximized falls in the range of −5 degrees to +5 degrees. This diffraction characteristic defines an allowable range of diffraction angles of the diffraction type light-condensing film to practically cover different wavelengths. An assumption is made that sufficiently collimated light close to parallel light having three wavelengths of $\lambda_1=0.48$ μm, $\lambda_2=0.55$ μm, and $\lambda_3=0.62$ μm corresponding to blue, green, and red primary colors is made incident to the diffraction type light-condensing film. At this time, if the diffraction type light-condensing film can contain a diffraction angle at which the diffraction efficiency of each wavelength is maximized within the range of −5 degrees to +5 degrees (0 degrees being in a normal direction of an output surface of the diffraction grating), the diffraction type light-condensing film can bend white light having wavelength components other than the three wavelengths in a vertical direction with suppressed dispersion.

To the diffraction type light-condensing film of the first embodiment, which is a transmission diffraction grating, sufficiently collimated light close to parallel light having three wavelengths $\lambda_1$, $\lambda_2$, and $\lambda_3$ in the ranges of $0.46 \leq \lambda_1 \leq 0.50$ μm (blue light), $0.53 \leq \lambda_2 \leq 0.57$ μm (green light), and $0.60 \leq \lambda_3 \leq 0.64$ μm (red light), for example, $\lambda_1=0.48$ μm, $\lambda_2=0.55$ μm, and $\lambda_3=0.62$ μm is made incident at an angle of $\theta_i$. Then, orders of diffraction at which the diffraction efficiency of each wavelength is maximized are $(m+m_0)$, m, and $(m-m_0)$ ($m_0=1, 2, \ldots$), m is in a range satisfying expressions (1) and (2), and a mean period d satisfies an expression (3).

$$m \times \{\lambda_2 \times (1-\sin \delta/\sin \theta_i)-\lambda_1\} \leq m_0 \times \lambda_1 \leq m \times \{\lambda_2 \times (1+\sin \delta/\sin \theta_i)-\lambda_1\} \quad (1)$$

$$m \times \{\lambda_3-\lambda_2 \times (1+\sin \delta/\sin \theta_i)\} \leq m_0 \times \lambda_3 \leq m \times \{\lambda_3-\lambda_2 \times (1+\sin \delta/\sin \theta_i)\} \quad (2)$$

(where $\delta$ is in the range of $0 \leq \delta \leq 5$ (degrees))

$$d = m \times \lambda_2/\sin \theta_i \quad (3)$$

These expressions indicate a more concrete form of the diffraction type light-condensing film to bend white light in a vertical direction with suppressed dispersion. When light having three wavelengths of $\lambda_1=0.48$ μm, $\lambda_2=0.55$ μm, and $\lambda_3=0.62$ μm is made incident at an angle of $\theta_i$ to the transmission diffraction grating, the transmission diffraction grating with the mean period d has orders of diffraction of $(m+m_0)$, m, and $(m-m_0)$ ($m_0=1, 2, \ldots$) at which the diffraction efficiency of each wavelength is maximized. In such a transmission diffraction grating, an "m"th-order diffraction angle is $\theta_2$ for $\lambda_2=0.55$ μm and the following expression (4) is established:

$$d \times (\sin \theta_i + \sin \theta_2) = m \times \lambda_2 \quad (4)$$

Accordingly, bending light having the wavelength of $\lambda_2$ to a vertical direction, i.e., $\theta_2=0$ needs the following:

$$d = m \times \lambda_2/\sin \theta_i \quad (5)$$

At this time, if an $(m+m_0)$th-order diffraction angle for $\lambda_1$ is $\theta_1$ and an $(m-m_0)$th-order diffraction angle for $\lambda_3$ is $\theta_3$:

$$d \times (\sin \theta_i + \sin \theta_1) = m \times \lambda_2 \times (1+\sin \theta_1/\sin \theta_i) = (m+m_0) \times \lambda_1 \quad (6)$$

$$d \times (\sin \theta_i + \sin \theta_3) = m \times \lambda_2 \times (1+\sin \theta_3/\sin \theta_i) = (m-m_0) \times \lambda_3 \quad (7)$$

To suppress dispersion, the following is needed with $\delta$ being a constant in the range of $0 \leq \delta \leq 5$ (deg):

$$-\delta \leq \theta_1, \theta_3 \leq \delta \quad (8)$$

From the expressions (6), (7), and (8), the following expressions defining "m" are obtained:

$$m \times \{\lambda_2 \times (1-\sin \delta/\sin \theta_i)-\lambda_1\} \leq m_0 \times \lambda_1 \leq m \times \{\lambda_2 \times (1+\sin \delta/\sin \theta_i)-\lambda_1\} \quad (9)$$

$$m \times \{\lambda_3-\lambda_2 \times (1+\sin \delta/\sin \theta_i)\} \leq m_0 \times \lambda_3 \leq m \times \{\lambda_3-\lambda_2 \times (1-\sin \delta/\sin \theta_i)\} \quad (10)$$

If the expressions (5), (9), and (10) are satisfied, light having wavelengths $\lambda_1$, $\lambda_2$, and $\lambda_3$ is diffracted within the range of $\pm\delta$ degrees. If $\theta_i=65$ degrees, $m_0=1$, and $\delta=1$ degree, a suitable transmission diffraction grating is obtained as mentioned below. In this case, the expressions (9) and (10) provide the following:

$$7.69 \leq m \leq 8.08 \quad (11)$$

To satisfy this, there is only one integer of m=8. Accordingly, the mean period d is about 4.85 μm according to the expression (5). The sectional shape of the grating may properly be selected to maximize the efficiency of ninth-order diffraction for $\lambda_1=0.48$ μm, the efficiency of eighth-order diffraction for $\lambda_2=0.55$ μm, and the efficiency of seventh-order diffraction for $\lambda_3=0.62$ μm.

Figure 2:
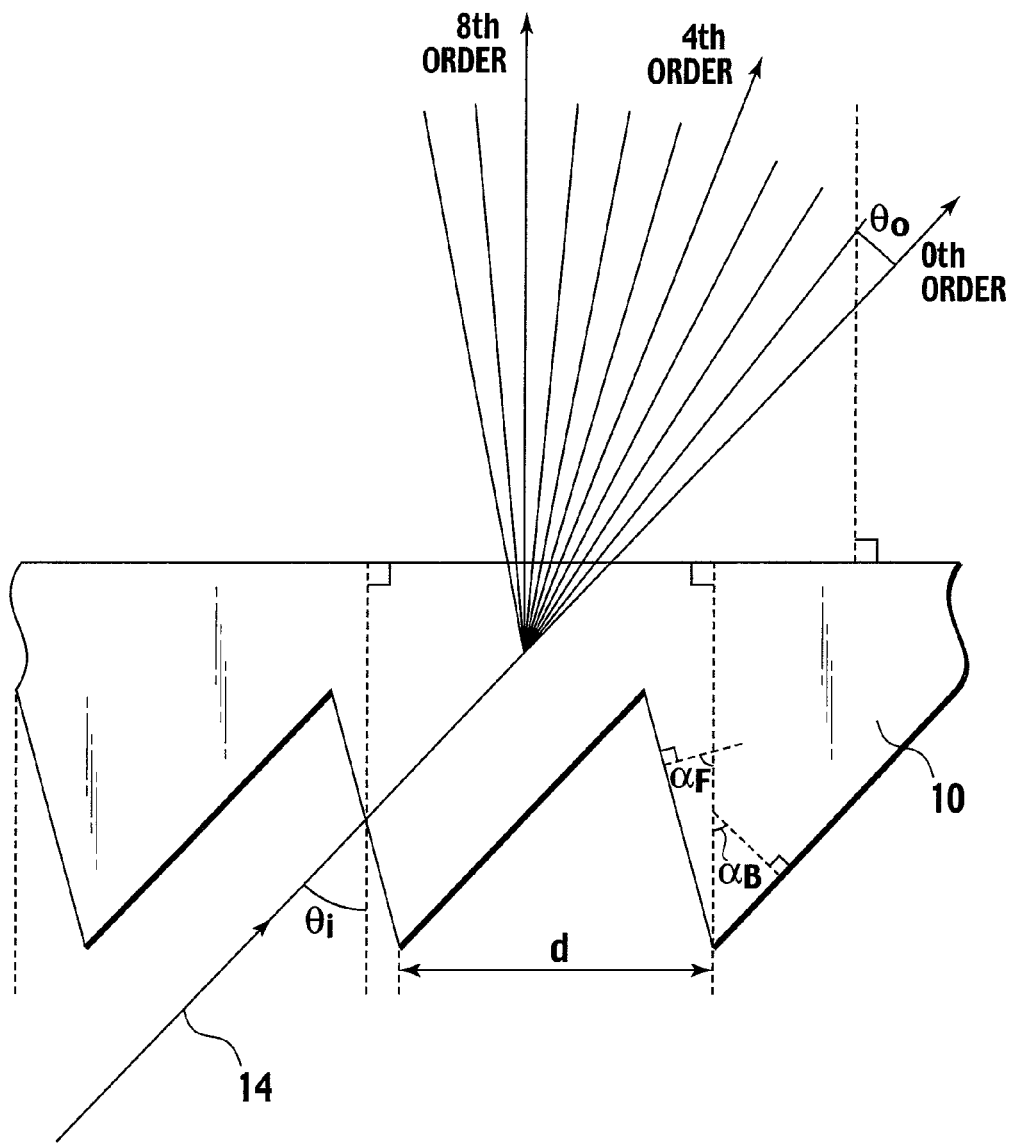
FIG. 2 is a view showing a relationship between order of diffraction and diffraction angle.

FIG. 2 shows a relationship between an order of diffraction and a diffraction angle. Among output light from a diffraction type light-condensing film, zeroth-order light is propagated in the same direction as incident light. Light that exits in a direction closer to a normal direction of the output surface relative to the zeroth-order light is positive order diffracted light. Light that exits on the opposite side is negative order diffracted light. Namely, light output in the normal direction of the output surface is always positive order diffracted light.

The diffraction type light-condensing film according to the first embodiment is a transmission diffraction grating having a slope whose normal forms an angle $\alpha_F$ equal to or larger than 70 degrees and equal to or smaller than 89.5 degrees to a normal of the top surface of the film or plate and the other slope whose normal forms an angle $\alpha_B$ with respect to the normal of the top surface of the film or plate, to satisfy $\theta_i/2-5 \leq 90-\alpha_B \leq \theta_i/2+5$ where $\theta_i$ is the above-mentioned incidence angle. The influence of $\alpha_B$ on the light-condensing effect of the diffraction type light-condensing film is small. The angle $\alpha_B$ can be used to control deflection so that a light beam having an optional incidence angle is output in a required direction. Setting $\alpha_B$ within the above-mentioned angular range results in orienting output light from the planar light source device using the diffraction type light-condensing film to the normal direction of the output surface. The larger the angle $\alpha_F$, the higher the light-condensing effect of the diffraction type light-condensing film, and therefore, it is preferable to be equal to or larger than 70 degrees. In practice, it is difficult to exceed 89.5 degrees due to limitations by metal mold processing and mold releasing during forming. Accordingly, $\alpha_F$ is preferable to be equal to or smaller than 89.5 degrees.

A diffraction type light-condensing film according to a second embodiment is the above-mentioned diffraction type light-condensing film but with $\alpha_F$ being equal to or larger than 73 degrees and equal to or smaller than 81 degrees. The angle $\alpha_F$ that is equal to or larger than 73 degrees is preferable because it increases the light-condensing ability of the film higher than that of the diffraction type light-condensing film of the first embodiment. At the same time, the angle $\alpha_F$ that is equal to or smaller than 81 degrees is preferable because it realizes good metal mold processing and mold releasing during forming to easily prepare the optical element.

A diffraction type light-condensing film according to a third embodiment is the above-mentioned diffraction type light-condensing film but with a pitch d equal to or smaller than 10 μm. Here, the pitch d indicates a distance from an apex of a sawtooth to an apex of the adjacent sawtooth. The pitch is not necessary to strictly be a constant value. If a standard deviation of the pitch varies over 4% of an average, diffraction efficiency deteriorates and the variations of the pitch are visible as unevenness. This is not preferable. It is preferable that the standard deviation of the pitch does not exceed 4% of an average. If the pitch exceeds 10 μm, the below-mentioned light-condensing effect is unobtainable and front brightness is low. It is preferable that the pitch is equal to or smaller than 10 μm.

A diffraction type light-condensing film according to a fourth embodiment is the above-mentioned diffraction type light-condensing film but with a pitch equal to or larger than 1 μm and equal to or smaller than 5 μm. As will be explained later, a pitch equal to or smaller than 5 μm provides a remarkable light-condensing effect, to greatly improve the front brightness of a planar light source device employing the diffraction type light-condensing film. On the other hand, a pitch smaller than 1 μm increases a dispersion effect specific to the diffraction grating, and therefore, is not appropriate for an optical element for a white light source.

Figure 3:
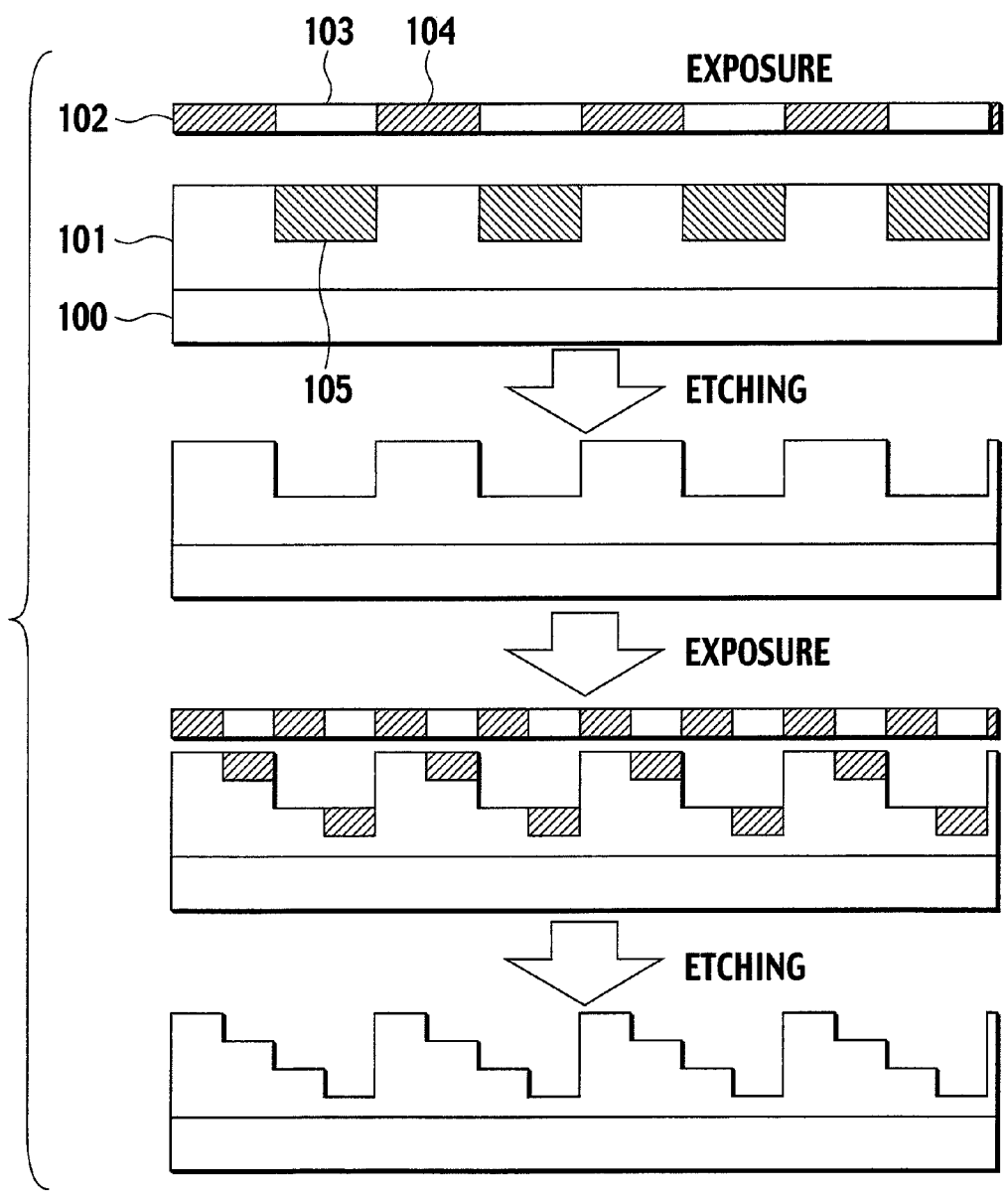
FIG. 3 is an explanatory view showing a multiple exposure technique of forming a diffraction grating approximated to four-level steps.

A diffraction type light-condensing film according to a fifth embodiment is the diffraction type light-condensing film of the fourth embodiment but with a grating sectional shape approximated to steps of N levels (N=4, 5, 6, 7, 8, . . . ). One standard method of forming a diffraction type light-condensing film is a multiple exposure method shown in FIG. 3. In FIG. 3, photosensitive resin is exposed and etched two times, to form a grating shape approximated to steps of N=4. In the figure, there are shown a base film 100, a photosensitive negative type resin composite layer 101, a photomask 102, an opening 103, a light shielding part 104, and an exposing part 105.

Figure 4:
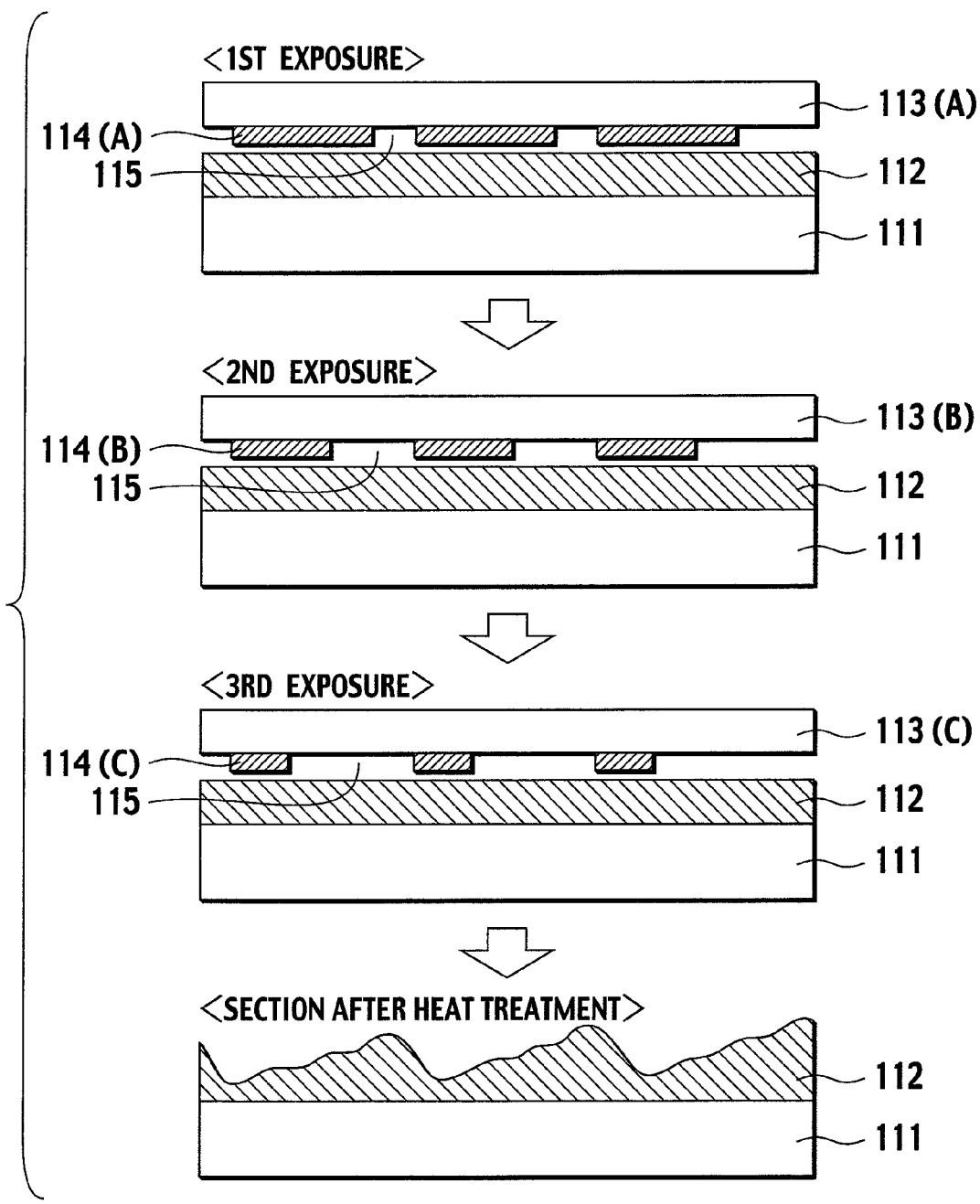
FIG. 4 is an explanatory view showing an exposure technique of forming a diffraction grating approximated to four-level steps.

One method of forming a diffraction type light-condensing film is disclosed in Japanese Patent Application Laid-Open Publication No. 2004-37518 or FIG. 4. This method prepares a photosensitive negative type resin composite layer containing at least a kind of polymerizable monomer such as pentaerythritol acrylate, irradiates the layer with activating light to form a latent image of four gradation levels or more of the exposure quantity of the activating light in the photosensitive negative type resin composite layer, and heats the layer without etching, to form corrugated surface. In the figure, the photosensitive resin is exposed to light three times, to form a grating shape approximated to steps of N=4. In the figure, there are shown a base film 111, the photosensitive negative type resin composite layer 112, a photomask 113, a light shielding part 114, and an opening 115.

The diffraction type light-condensing film of the fourth or fifth embodiment has a shape appropriate for a grating sectional shape of a transmission diffraction grating (diffraction type light-condensing film) used to bend white light in a vertical direction. The sawteeth shape having sharp tips or the shape approximated to steps of N levels can efficiently bend light in a vertical direction.

Figure 5:
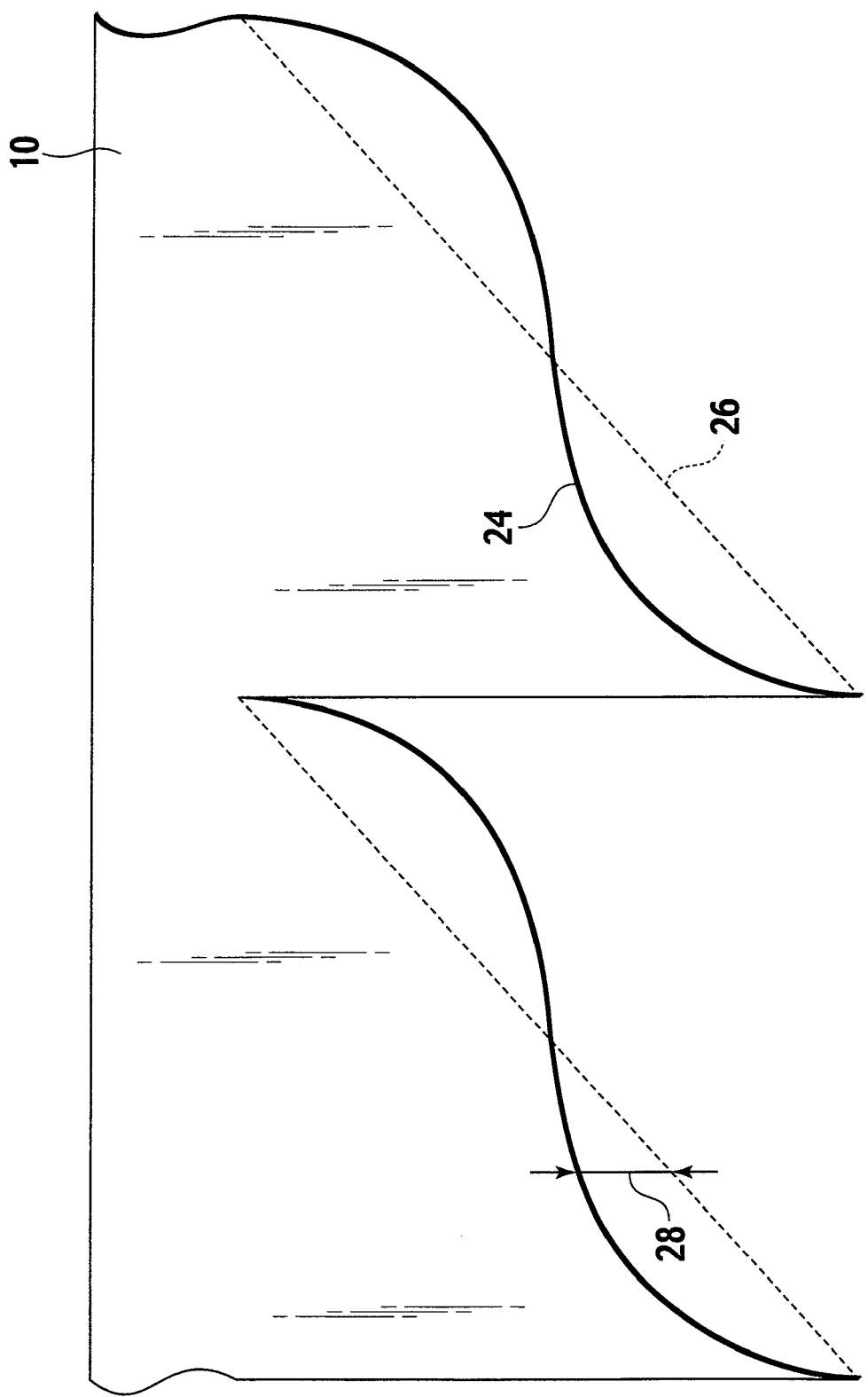
FIG. 5 is a view showing a deviation from a sawtooth shape of a diffraction type light-condensing film (diffraction grating).

The grating sectional shape may be deviated as shown in FIG. 5 from an ideal sawtooth shape. In this case, the quantity (28 in FIG. 5) of a deviation 24 from a straight line 26 is preferable to be equal to or smaller than 0.2 μm at the maximum. Depending on conditions, diffraction efficiency becomes maximum at a location slightly shifted from the sawtooth shape. An optimum grating shape is dependent on an incidence angle, a wavelength, a period, a depth, and a refractive index. With use of a method of finding a strict solution of the diffraction efficiency of a periodic diffraction grating, the shape of a grating may be changed and numerically calculated through trial and error, to obtain an optimum shape.

To mass-produce diffraction gratings having deep grooves and wide areas used for the invention, a mold transfer technique is used. Transferred resin is hardened with heat or UV light. A method of forming a mold having deep grooves according to the present invention includes applying electron beam resist to a substrate, drawing with electron beams, and etching by RIE. Other methods include a method of exposing and developing with X rays, a method of exposing and developing gray-scale mask patterns, and a method of machining with a cutting tool. A material to which a grating pattern is transferred is dependent on use conditions and is preferably acrylic photoresist having good optical transparency.

Figure 6:
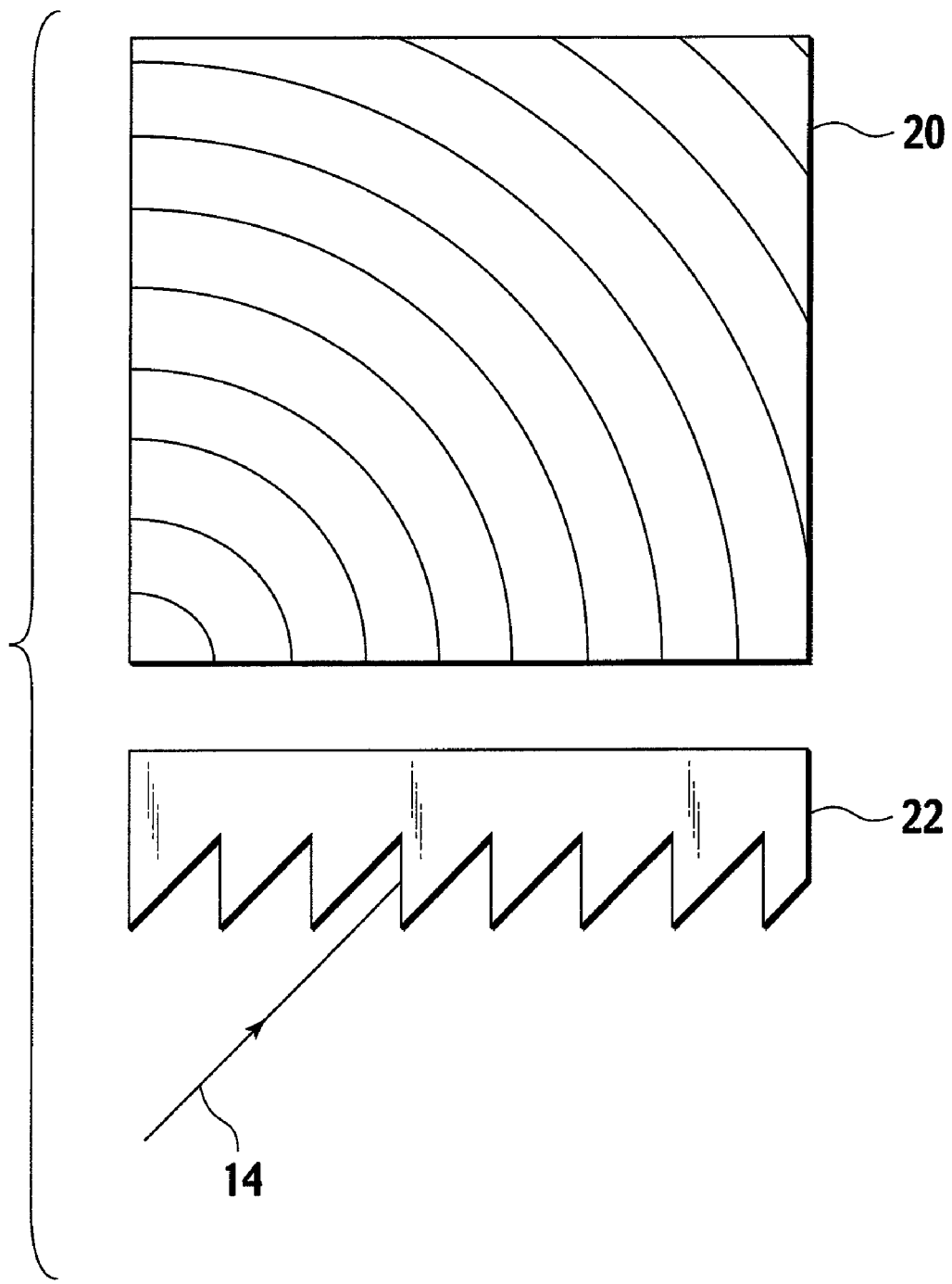
FIG. 6 is a view showing a diffraction type light-condensing film (diffraction grating) having sector grooves.

A diffraction type light-condensing film according to a sixth embodiment is the diffraction type light-condensing film, i.e., the transmission diffraction grating of any one of the first to fifth embodiments but with sector grating grooves. This diffraction type light-condensing film has a grating groove arrangement of a diffraction grating appropriate for a backlight with a LED arranged at the corner of a light guide. The grating grooves arranged in a sector configuration can efficiently bend light propagated from the LED at the corner to a vertical direction and improve brightness in a front direction. As shown in FIG. 6, it is preferable that the grating has a sawteeth sectional shape and the grating grooves are formed in concentric circles around a certain point. The sector grating grooves are not always necessary to be continuous grooves.

A diffraction type light-condensing film according to a seventh embodiment is the diffraction type light-condensing film or the transmission diffraction grating of any one of the first to sixth embodiments that bends white light of a visible region having an incidence angle $\theta_i$ of 60°±15° but with a sawteeth shape of $m_1$, $m_2$=1, 2, 3, . . . , a mean period d of $m_1 \times (6.0 \pm 2.0)$ μm, and a mean depth h of $m_2 \times (5.0 \pm 1.0)$ μm, or with a sawteeth-approximated surface shape having N levels (N=4, 5, 6, 7, 8, . . . ).

A diffraction type light-condensing film according to an eighth embodiment employs the above-mentioned relational expressions to have a proper period, grating groove depth, and sectional shape for a transmission diffraction grating suitable for light having an incidence angle $\theta_i$ in the range of 60°±15°.

In the diffraction type light-condensing film of any one of the first to seventh embodiments, orientation of the grooves of the transmission diffraction grating may be orthogonal or parallel to incident light. The grooves may be formed in longitudinal and lateral directions.

Figure 7:
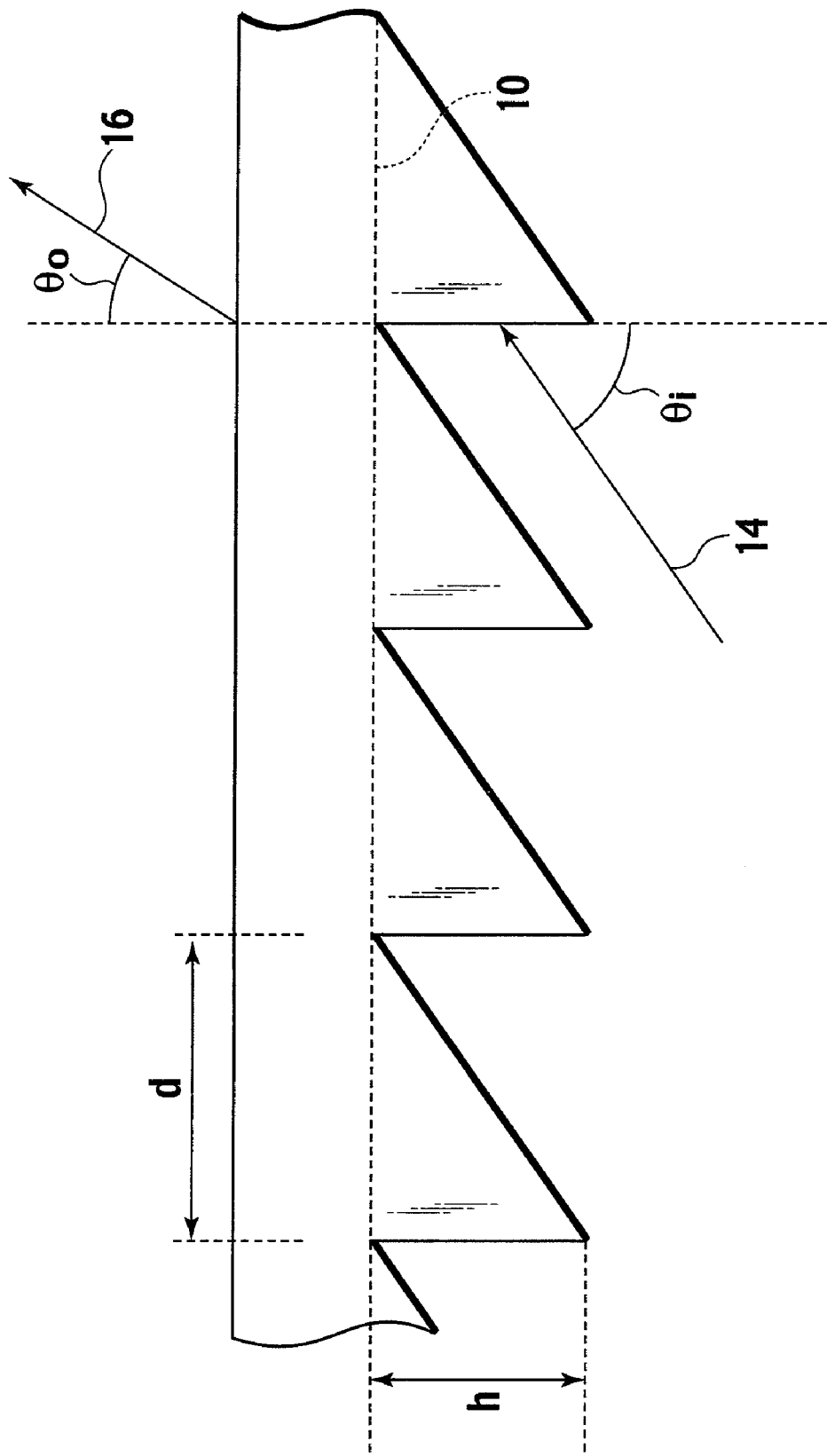
FIG. 7 is a view explaining an incidence angle $\theta_i$ and an output angle $\theta_o$ on a diffraction type light-condensing film (diffraction grating).

FIG. 7 shows a relationship between an incidence angle and an output angle on a diffraction grating. From a surface of a planar light source, such as a light guide used for a liquid crystal, is emitted white light containing red, green and blue primary colors. Due to design convenience of a planar light source device, an angle formed between a normal direction of an incidence surface of the diffraction grating and incident light, i.e., an incidence angle $\theta_i$ frequently comes in the range of 20 to 70 degrees. At this time, if 60% of white light passed through the diffraction grating gathers in a vertical direction within the range of ±10°, i.e., the direction of an observer, it can be said that the light has been bent in a vertical direction. The wavelength dependence of a diffraction angle is small if the difference is equal to or smaller than 10°. It is necessary to consider not only the above-mentioned wavelength dispersion but also polarization dispersion. In connection with diffraction efficiency for an order of diffraction closest to a vertical direction, there will be a polarized wave A of large diffraction efficiency and a polarized wave B of small diffraction efficiency. Then, it is said that polarization dependence is small if (A−B)/A is equal to or smaller than 20%. If the polarization dependence is equal to or larger than 5%, it is preferable that a liquid crystal display employs a polarized wave of higher diffraction efficiency. The diffraction grating may have, in addition to the light bending function, condensing and diffusing functions. A surface on which a diffraction grating is formed is not only a flat surface but also a curved surface to add optical functions. The diffraction grating may be used with a prism sheet. For example, in an xyz space, the diffraction grating bends light in an x-direction and the prism sheet bends the same in a y-direction.

A diffraction type light-condensing film according to an eighth embodiment is the diffraction type light-condensing film of any one of the first to seventh embodiments but with a film having a function of preventing polarization split, color separation, or reflection arranged adjacent to the diffraction type light-condensing film, or on one of the front and back surfaces of the diffraction type light-condensing film.

A diffraction type light-condensing film according to a ninth embodiment is the diffraction type light-condensing film of the eighth embodiment but with functions of preventing polarization split, color separation, and reflection provided by a grating of a relief shape having a period equal to or smaller than 0.6 µm and a depth equal to or smaller than 0.5 µm.

In this way, combining a diffraction type light-condensing film used to bend white light emitted from a planar light source to a vertical direction and a function of preventing polarization split, color separation, or reflection can improve the efficiency of use of light.

The function of preventing polarization split, color separation, or reflection can be realized by forming a fine periodic structure.

A tenth embodiment is a planar light source device characterized in that the diffraction type light-condensing film of any one of the first to ninth embodiments is arranged on a light output surface of a planar light source.

Figure 8:
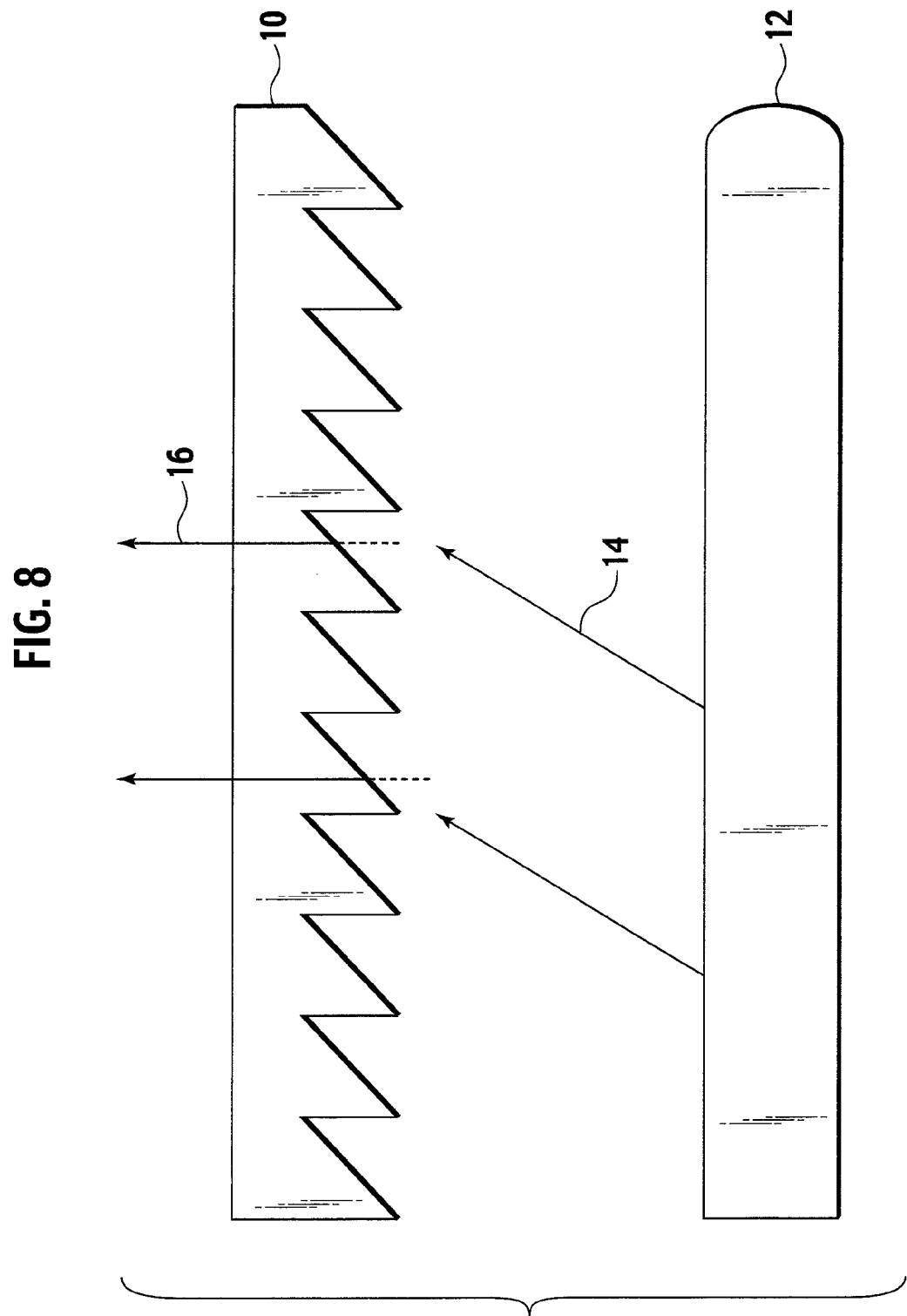
FIG. 8 is a view explaining a diffraction type light-condensing film (diffraction grating) to bend light that is obliquely emitted from a planar light source to a vertical direction.
Figure 9:
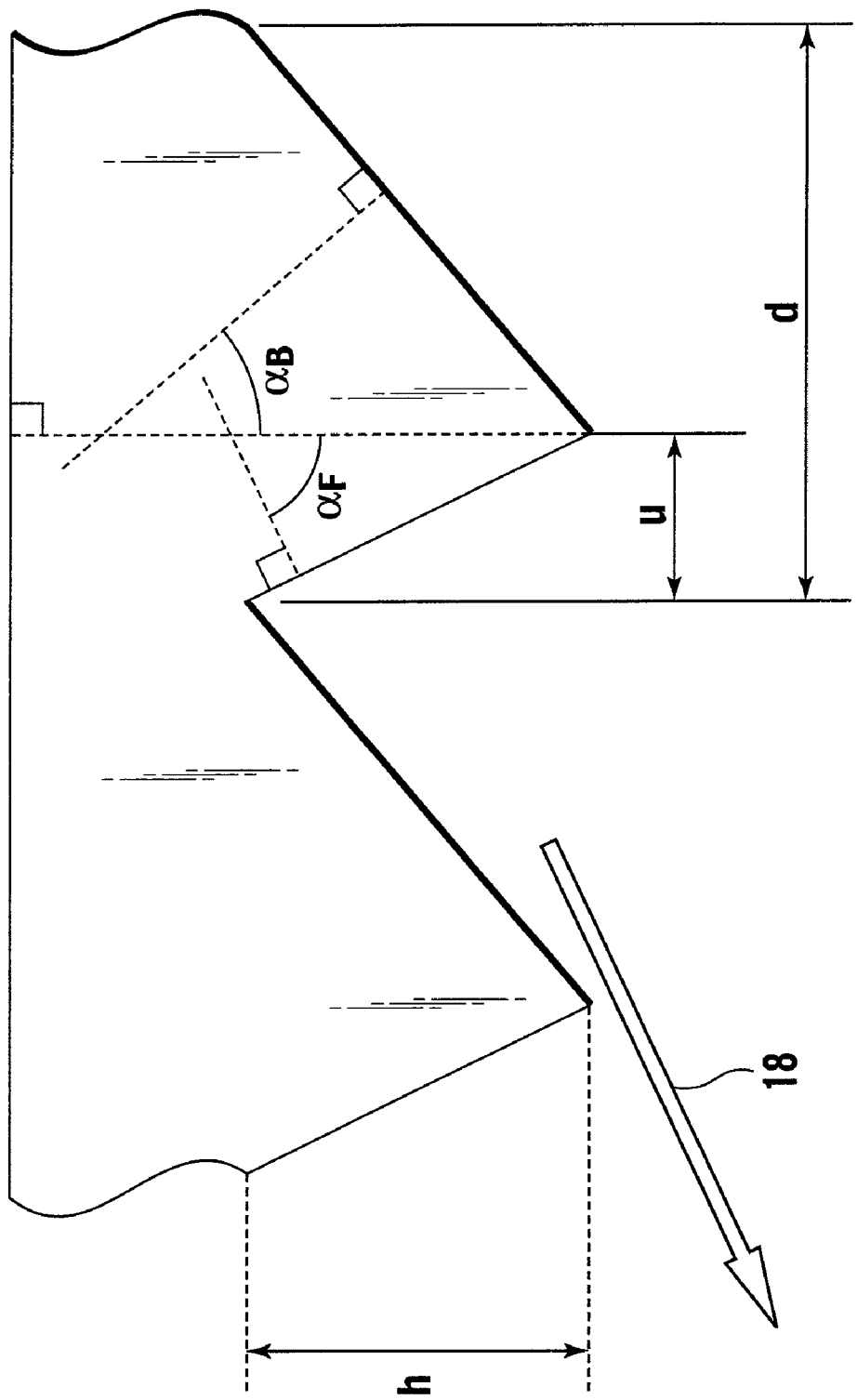
FIG. 9 is a view explaining a sawteeth shape of a diffraction type light-condensing film (diffraction grating).

The diffraction type light-condensing film of this embodiment bends light obliquely emitted from the planar light source to a vertical direction as shown in FIG. 8. Like the tenth embodiment, employing the diffraction type light-condensing film can efficiently bend white light emitted from the planar light source, and therefore, the planar light source device can realize high brightness in a front direction and minimize coloring due to dispersion.

An eleventh embodiment employs the planar light source device of the tenth embodiment, in which light is output in an angular range of 20° to 70° with respect to a normal direction of a light output surface of a planar light source if no diffraction type light-condensing film is arranged. If a diffraction type light-condensing film is arranged, 60% or over, preferably 70% or over of total output light from the planar light source is output in an angular range of −10° to +10° with respect to the normal direction of the light output surface of the planar light source.

If the diffraction type light-condensing film has a transmission diffraction grating having a sawteeth sectional shape, output light from the planar light source may be made incident to the diffraction grating from a slope side that forms an angle of $\alpha_F$ to the top surface of the film, to improve diffraction efficiency.

Generally, a Fresnel loss increases when light obliquely enters or exits a film. Accordingly, orienting a grating surface having a sawteeth shape toward a planar light source can more reduce the Fresnel loss more effectively than oppositely arranging the same. If the diffraction grating is made of a plate, light vertically exits the surface thereof, to reduce the Fresnel loss.

The eleventh embodiment outputs 60% or more, preferably 70% or more of light in the angular range of −10° to +10°, to improve the front brightness of a liquid crystal display. A planar light source device serving as a backlight according to this embodiment can suppress dispersion and improve display quality.

A twelfth embodiment provides the planar light source device of the tenth or eleventh embodiment with a diffuser in addition to the diffraction type light-condensing film.

Figure 10:
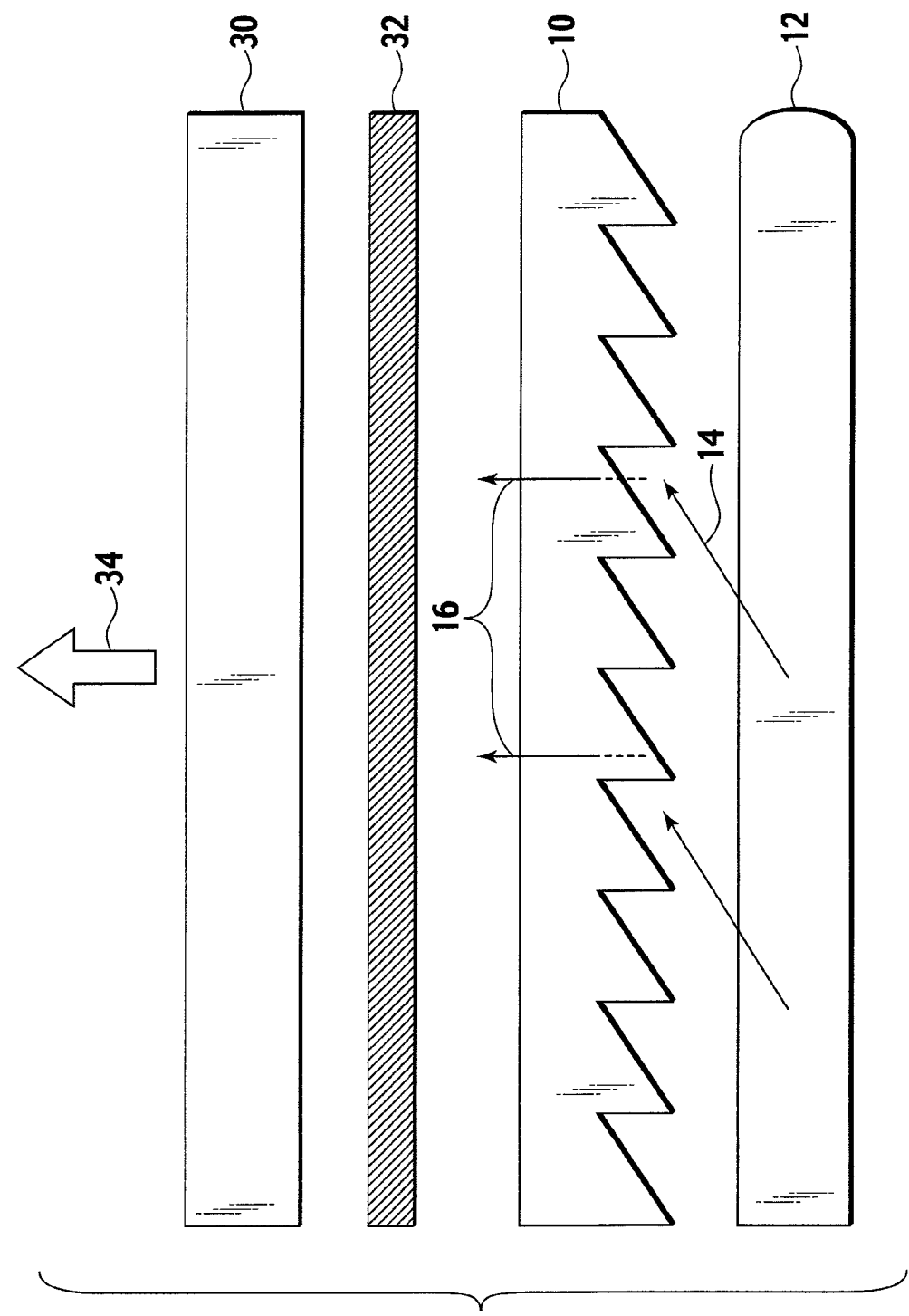
FIG. 10 is a view showing a configuration of a liquid crystal display.
Figure 11:
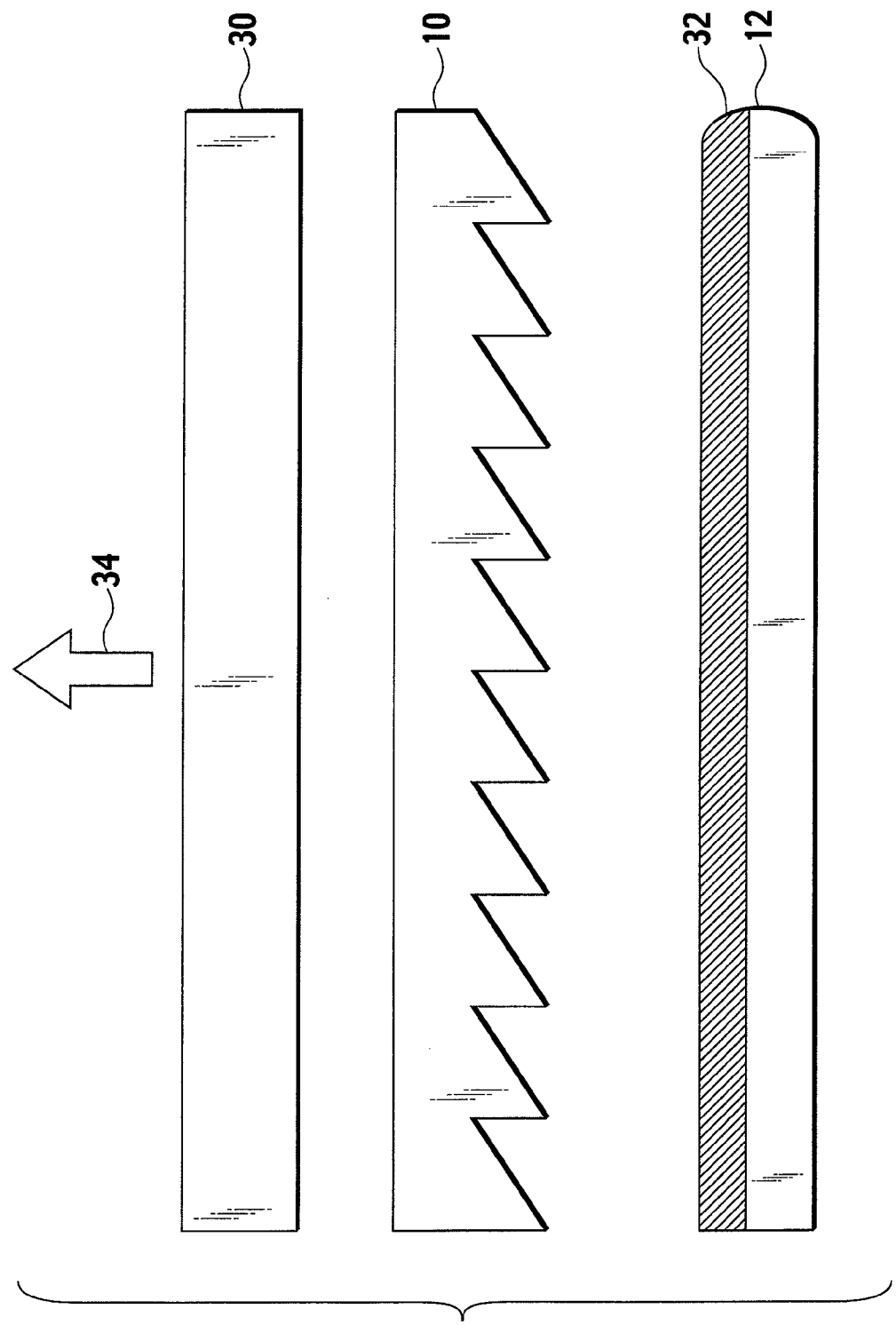
FIG. 11 is a view showing a configuration of a liquid crystal display.

The diffuser is effective because a human eye can recognize even a little chromatic dispersion. A method of combining the diffuser and diffraction type light-condensing film may be based on a technique disclosed by the present inventor in Japanese Patent Application Laid-Open Publication No. 2003-222727. The diffraction type light-condensing film and diffuser may be arranged and combined such that a diffuser is formed on each side of a film, or two diffraction gratings and one diffuser are combined together. In FIG. 10, a light guide 12, a diffraction type light-condensing film 10, and a diffuser 32 are arranged in this order. In FIG. 11, a light guide 12, a diffuser 32, and a diffraction type light-condensing film 10 are arranged in this order. Alternatively, a light guide, a diffuser, a diffraction type light-condensing film, and a diffuser may be arranged. Diffusion by diffuser may be realized with surface irregularities, or a refractive index distribution inside a film.

A thirteenth embodiment is based on the planar light source device of the twelfth embodiment and employs a hologram diffuser to limitedly diffuse incident light in a specific angular range.

Figure 12:
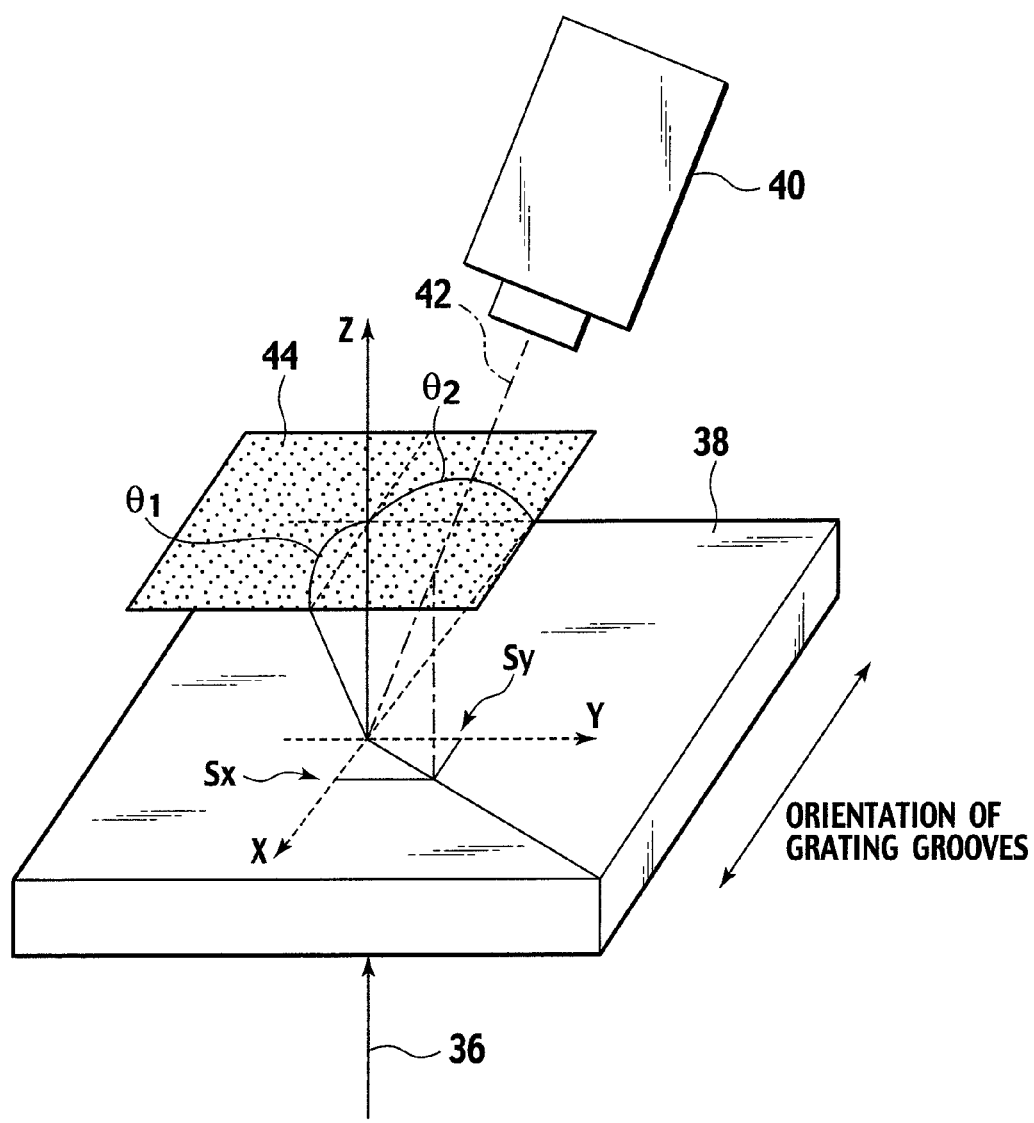
FIG. 12 is an explanatory view showing a method of determining and measuring the diffusion characteristic of a transmission hologram diffuser.

In this way, the diffuser is preferably a hologram diffuser that can regulate a diffusion angle and realize high diffusion efficiency. When light is propagated in a z-direction, a direction parallel to grooves of a diffraction grating is x. In FIG. 12, a light scattering direction due to a diffuser is defined with unit vectors ($S_x$, $S_y$, $S_z$). The maximums of $S_x$ and $S_y$ are defined with $\sin(\theta_1)$ and $\sin(\theta_2)$. In this case, chromatic dispersion occurs in a y-direction, and therefore, the range of $\theta_1$ is minimized and the range of $\theta_2$ is set to minimum angles necessary for eliminating the chromatic dispersion. A method of manufacturing such a hologram diffuser may be one disclosed in an embodiment of Japanese Patent Application Laid-Open Publication No. 2002-71959. The hologram diffuser may be of a surface relief type or a volume phase type. The diffusion characteristic of a hologram diffuser may vary depending on a location.

A fourteenth embodiment employs a planar light source device of the fifteenth embodiment and integrally forms a hologram diffuser on the light output surface of a light guide.

When a light guide, a hologram diffuser, and a diffraction type light-condensing film are arranged in this order, integrally forming the hologram diffuser on the light output surface of the light guide can reduce a Fresnel loss.

A fifteenth embodiment employs the planar light source apparatus of any one of the tenth to fourteenth embodiments and arranges a reflection preventive film on the light output surface of the diffraction type light-condensing film.

Light emitted from the planar light source is bent by the film having a relief shape and is vertically output from the opposite side of the film. Whenever light passes through an interface between air and the film, about 4% of the light is lost by Fresnel reflection. To prevent this, such a reflection preventive coating (anti-reflection coating) is arranged. A reflection preventive function is realized by covering it with a dielectric multilayer. A method of forming an anti-reflection coating with a dielectric multilayer film is described in, for example, "Optical Thin Film Second Edition" edited by Shiro Fujiwara, written by Hideo Ikeda, Kouzou Ishiguro, and Eiji Yokota, Kyoritsu Shuppan, 1984, pp. 98 to 109. This function can also be realized by arranging a small-period grating. It is preferable that the period of the grating is 0.28±0.08 µm and the depth thereof is 0.22±0.1 µm. In order to minimize a Fresnel loss by reducing the number of interfaces between the film and air, it is preferable that the light bending relief shape and the grating of small period are on the front and back surfaces of the same film. A plurality of such films may be arranged one on another. The light output surface of a light guide may preferably have a diffuser or a reflection preventive coating.

Embodiment

Figure 13:
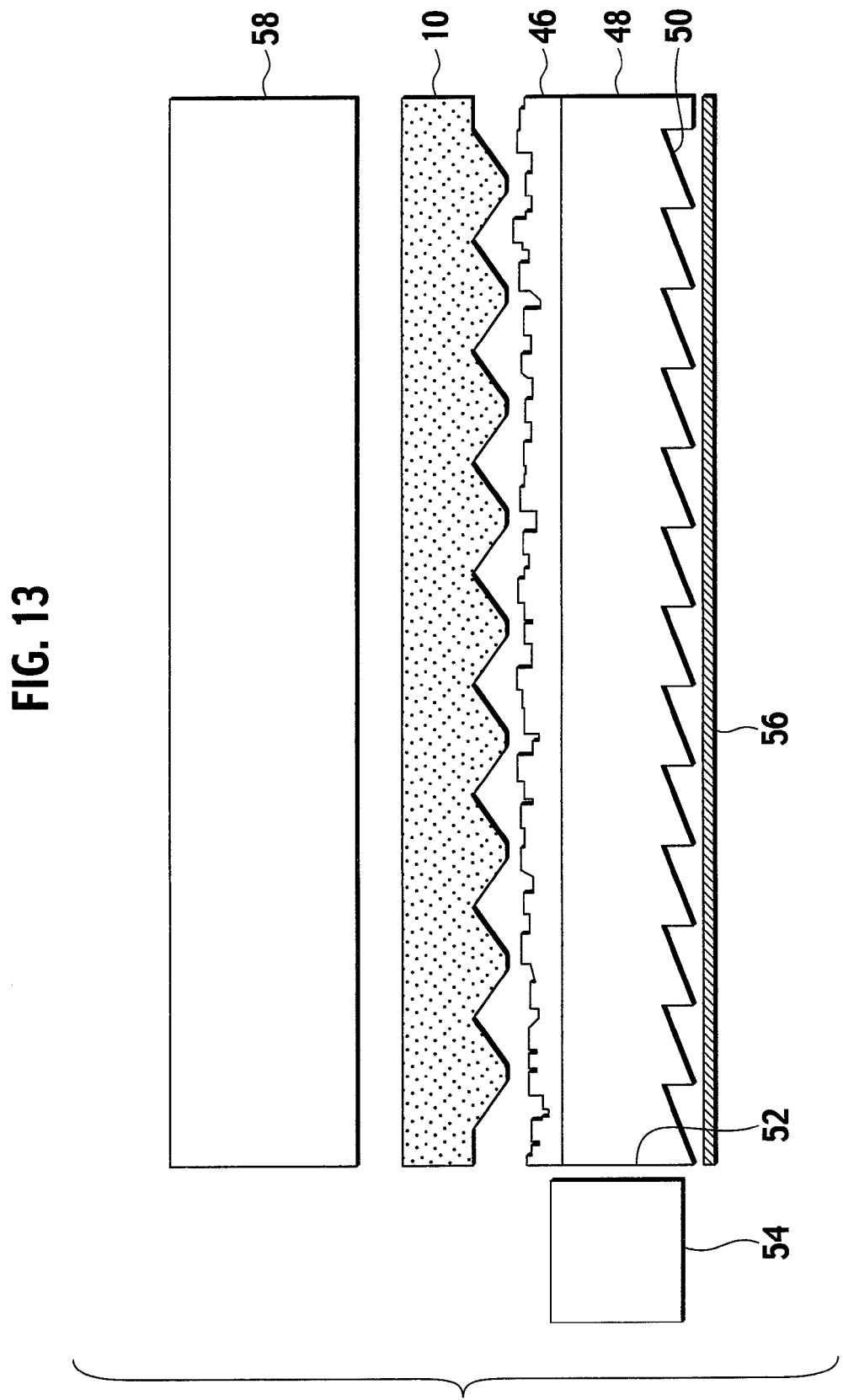
FIG. 13 is a view showing a configuration of a liquid crystal display.

FIG. 13 shows a backlight structure employing a light guide 48 according to an embodiment. This backlight structure is for a small liquid crystal display such as of a cellular phone. From a lower side of the drawing, the backlight consists of a reflection plate 56, the light guide 48, a hologram diffuser 46, and a diffraction type light-condensing film (light bending diffraction grating) 10. The light guide 48 and hologram diffuser 46 are integrally formed. Along a light incident end face 52 of the light guide 48, there is a LED light source 54. In this structure, light emitted from the LED light source 54 is made incident to the light incident end face 52 of the light guide 48. The incident light is totally reflected several times by reflection grooves formed on a back surface 50 of the light guide and is output from the hologram diffuser 46 formed on an output surface of the light guide. The diffraction type light-condensing film 10 diffracts the light in a vertical direction so that distributed light substantially having uniform brightness is transmitted to a liquid crystal surface that is not shown.

Figure 14:
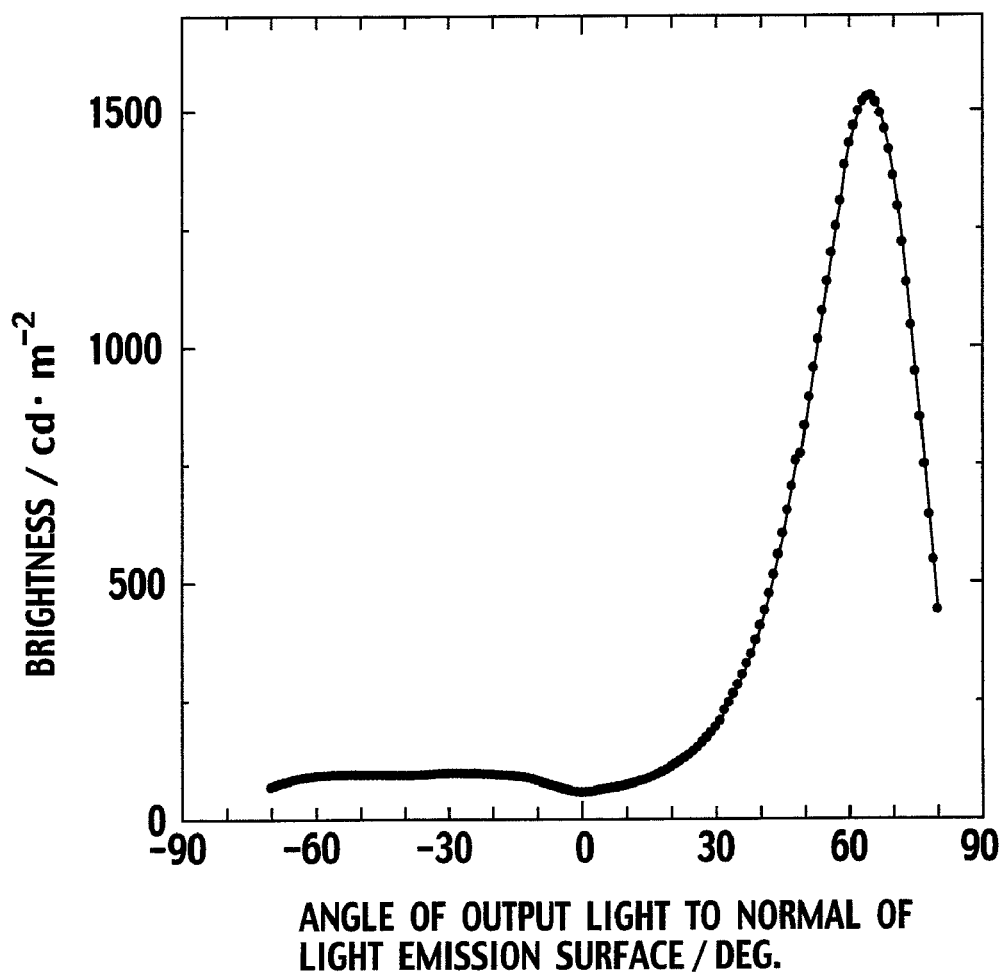
FIG. 14 is a distribution of angles of output light from a planar light source device with a white LED light source arranged at an end face of a light guide shown in FIG. 15 and a silver-deposited reflection sheet on a lower surface thereof.

FIG. 14 shows an output light distribution of the above-mentioned backlight without the diffraction type light-condensing film. The light source has four white LEDs (NSCW335T) of Nichia Kagaku connected in parallel and a direct current of 60 mA is applied to the LEDs. Measurement is carried out with RISA COLOR/CD7 of HI-LAND.

Figure 15:
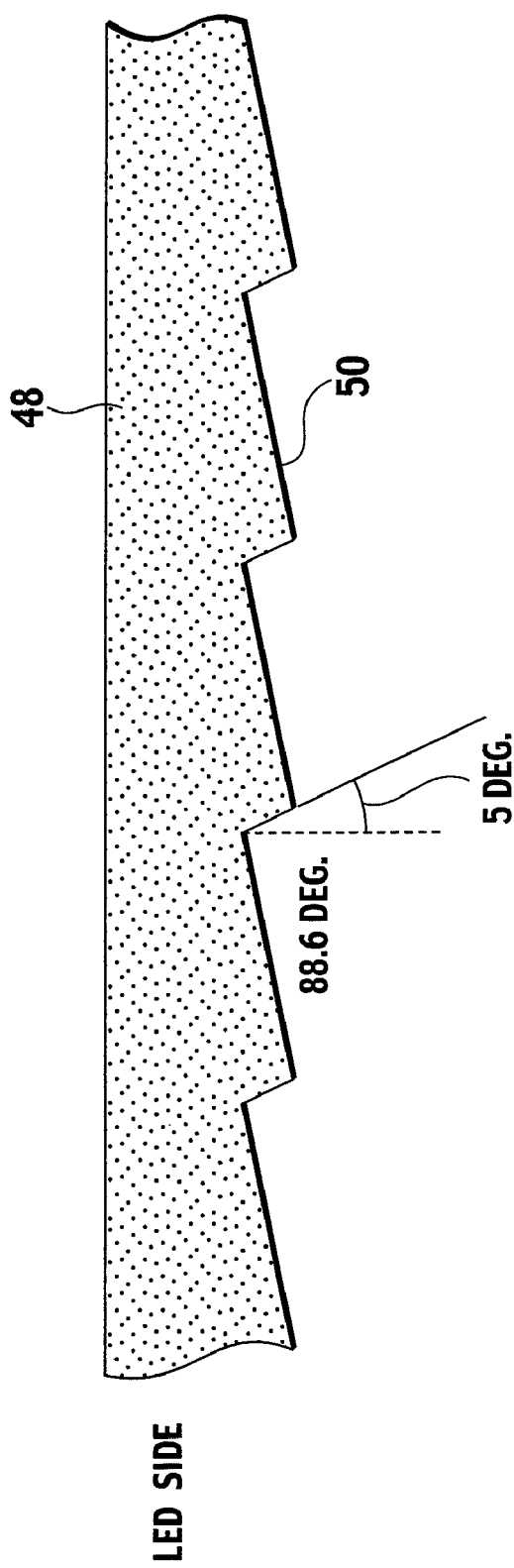
FIG. 15 is a sectional view showing the light guide.

The light guide 48 is formed by injection molding with use of polycarbonate. Its thickness is 0.8 mm and reflection grooves on the back surface thereof have a structure shown in FIG. 15. Periods thereof are at random in the range of 120 to 150 µm to prevent moires caused with pixels of a liquid crystal panel. The hologram diffuser 46 formed on the output surface has diffusion characteristics of 60 degrees in a direction parallel to the light incident end face 52 (i.e., a diffusion angle at which light intensity is halved is 60 degrees) and one degree in a direction orthogonal to the light incident end face 52.

Photo-curable resin to form the diffraction type light-condensing film 10 is acryl-based ultraviolet-ray-curable resin such as urethane acrylate and epoxy acrylate.

Figure 16:
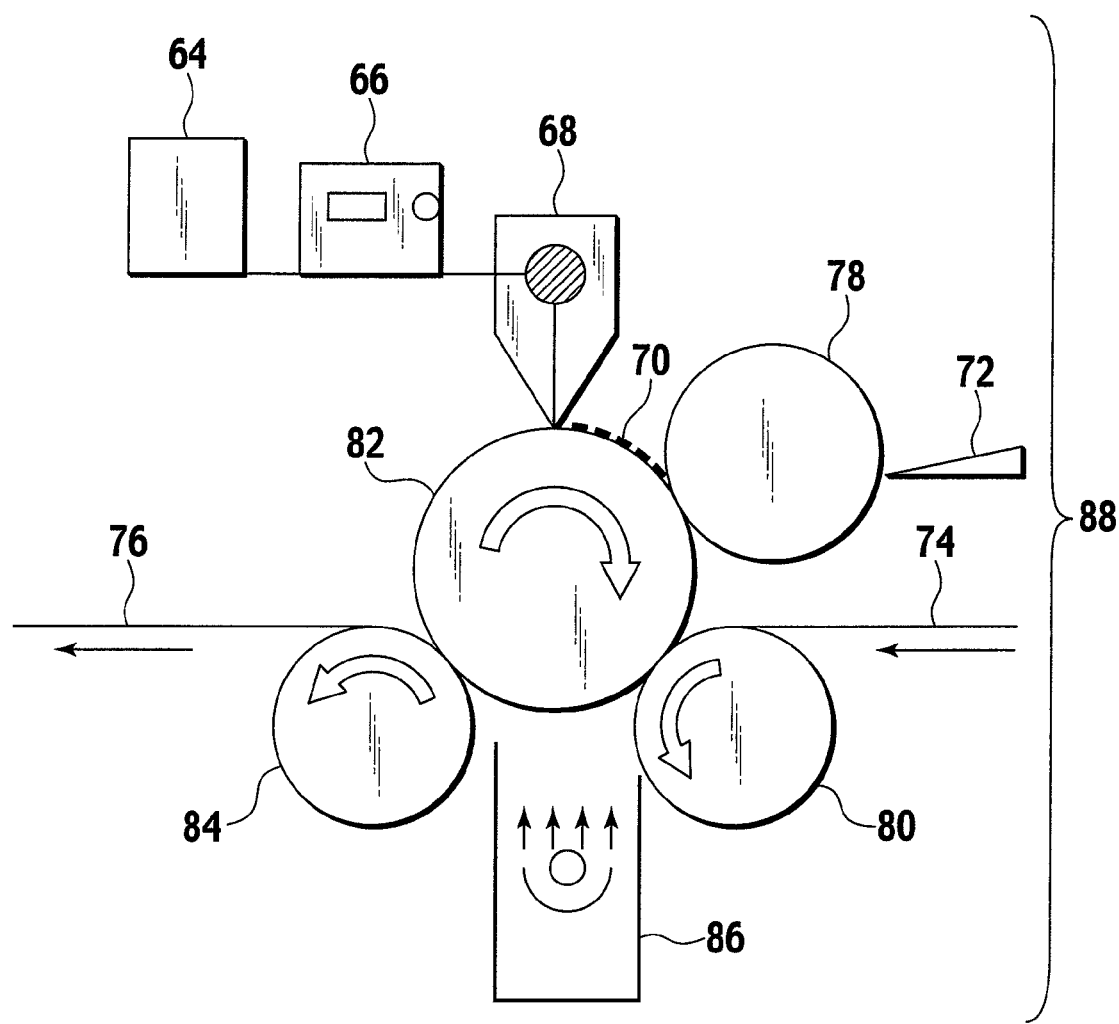
FIG. 16 is a sectional view roughly showing an apparatus for manufacturing a diffraction type light-condensing film (diffraction grating).

Next, a manufacturing apparatus 88 and a manufacturing method of the diffraction type light-condensing film 10 will be explained. FIG. 16 shows the manufacturing apparatus 88 of the diffraction type light-condensing film 10. A metal mold roll 82 faces a supply head 68 for supplying photo-curable resin 70. On the downstream side of the rotation direction of the metal mold roll 82, there are arranged a metering roll 78, a nip roll 80, a ultraviolet ray emitter 86, and a mold release roll 84 in this order.

A peripheral surface of the metal mold roll 82 has diffraction grating grooves to be transferred to the surface of the photo-curable resin 70. The diffraction grating grooves are formed by preparing a diamond cutting tool and by processing grooves on the surface of the metal mold roll 82 with the diamond cutting tool and a precision processing machine. The metal mold roll 82 is made of a brass material, is provided with the grooves with the diamond cutting tool, and is quickly plated with chrome by electroless plating for oxidation protection, glossing, and mechanical strength. According to this embodiment, the photo-curable resin 70 is SANRAD R201 (trade name by Sanyo Kasei Kogyo).

During manufacturing, the photo-curable resin 70 is supplied from a resin tank 64 to the metal mold roll 82 through a pressure controller 66 and the supply head 68. When the photo-curable resin 70 is supplied, a supply pressure thereof is detected with a pressure sensor and is controlled with the pressure controller 66, to adjust a pressure for applying the resin to the metal mold roll 82. The thickness of the photo-curable resin 70 applied to the metal mold roll 82 is adjusted to a constant value with the metering roll 78. The metering roll 78 has a doctor blade 72, to scrape resin attached to the metering roll 78 and stabilize the uniformity of the resin applied to the metal mold roll 82.

Between the nip roll 80 and the metal mold roll 82 on the downstream side of the metering roll 78, a transparent base film (translucent film) 74 is fed. The transparent base film 74 is held between the nip roll 80 and the metal mold roll 82, to tightly attach the transparent base film 74 to the photo-curable resin 70. When the photo-curable resin 70 attached with the transparent base film 74 reaches the ultraviolet ray emitter 86, the ultraviolet ray emitter emits ultraviolet rays to harden the photo-curable resin 70 and stick the resin and transparent base film 74 together, thereby forming an integrated film. Thereafter, the mold release roll 84 removes the integrated film sheet 76 from the metal mold roll 82. In this way, the long film sheet 76 is continuously provided.

The film sheet 76 thus formed is cut into a predetermined size to provide the diffraction type light-condensing film 10. The diffraction type light-condensing film (diffraction grating) may be formed by injection molding or thermal pressing. In this case, acryl-based thermoplastic resin such as polymethyl methacrylate or thermoplastic resin such as polycarbonate and polycycloolefin is used.

According to this embodiment, the transparent base film 74 is made of polyethylene terephthalate (PET). It is also possible to use polycarbonate, acryl resin, thermoplastic urethane, and the like. The photo-curable resin 70 may be selected from other materials such as acrylic modification epoxy and acrylic modification urethane. A light source of the ultraviolet ray emitter 86 has a metal-halide lamp (maximum 8 Kw). A feed speed of the film sheet 76 is 3 m/minute. The feed speed may be changed according to the hardening characteristic of the photo-curable resin 70 and the light absorbing characteristic of the transparent base film 74. A metal-halide lamp having a higher W (watt) may be employed to increase the feed speed.

The planar light source device manufactured in this way has a sufficient brightness in the normal direction of the normal plane, involves no unevenness due to moire or no coloring due to dispersion, and provides excellent characteristics as a backlight of a liquid crystal display. Measurement mentioned below is carried out by making light having the angular distribution shown in FIG. 14 incident to a diffraction type light-condensing film, and RISA COLOR/CD7 of HI-LAND is used to examine an angle dependence of output light strength.

Figure 17:
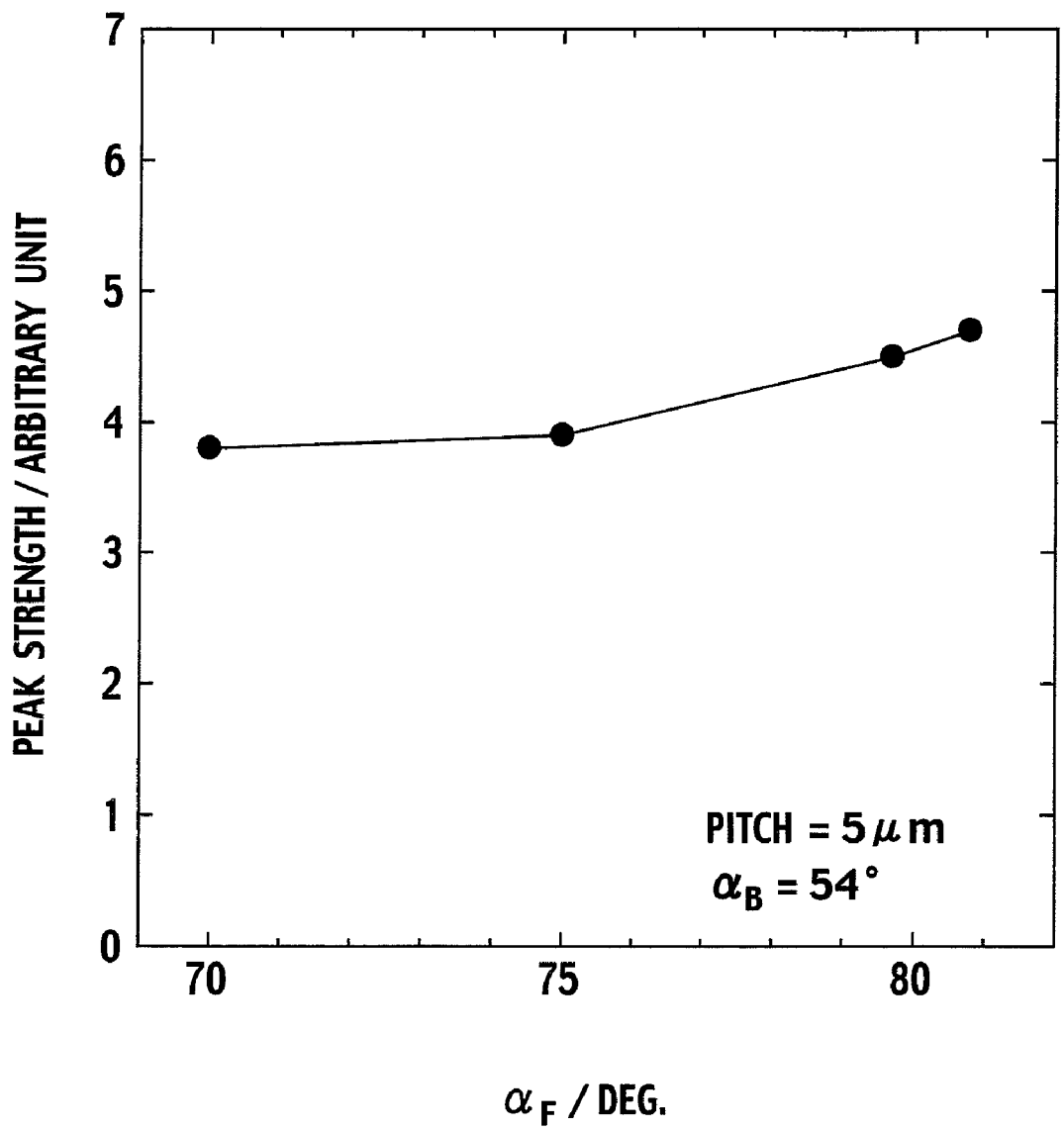
FIG. 17 shows a peak strength curve of output light from a diffraction grating having a pitch of 5 μm and $\alpha_B$ of 54° when $\alpha_F$ is changed.
Figure 18:
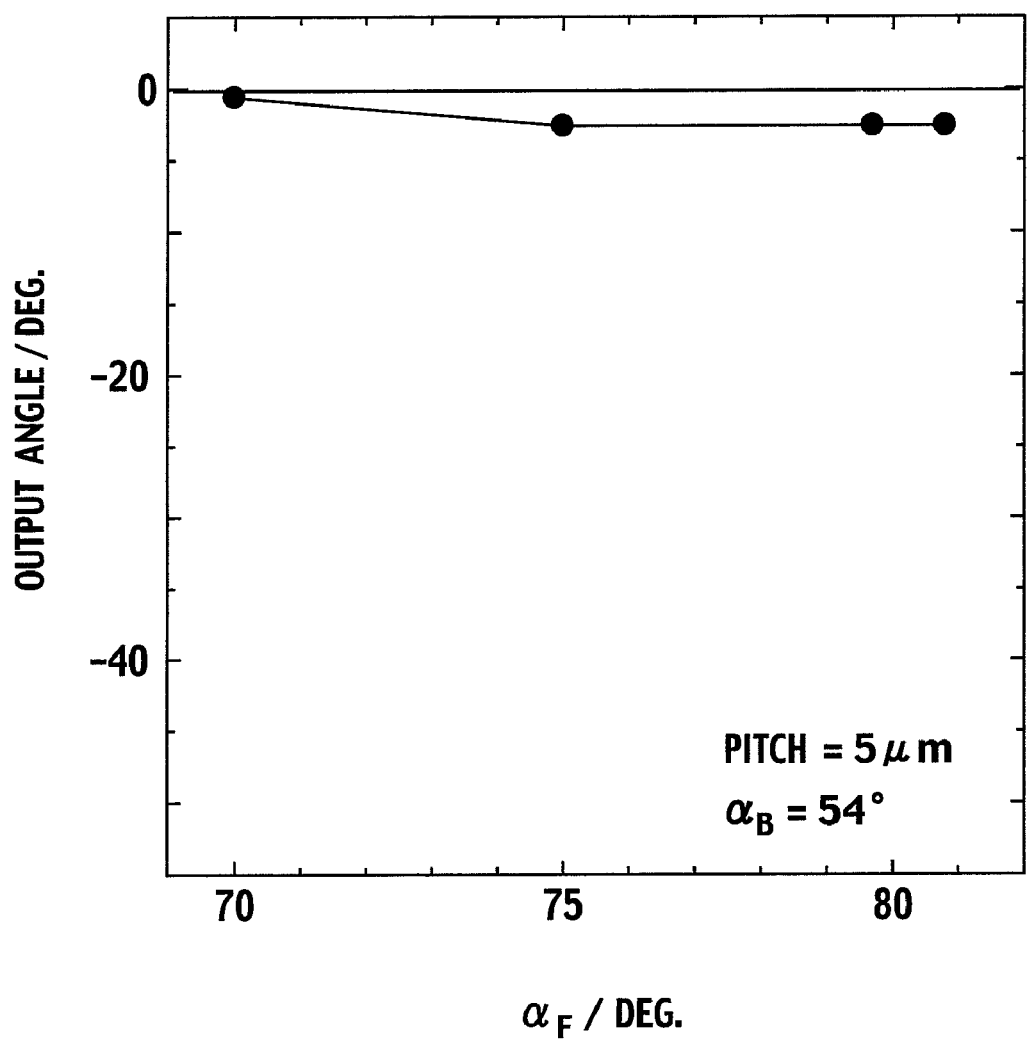
FIG. 18 shows a peak angle curve of output light from diffraction grating having a pitch of 5 μm and $\alpha_B$ of 54° when $\alpha_F$ is changed.

FIG. 17 shows a peak strength curve of output light from a diffraction grating having a pitch of 5 μm and $\alpha_B$ of 54° with $\alpha_F$ being changed. As $\alpha_F$ increases, the strength of output light increases. When $\alpha_F$ is 81°, the peak strength is 20% higher than $\alpha_F$ of 70°. As shown in FIG. 18, peak angles are substantially not affected by a change in $\alpha_F$. Namely, the larger the $\alpha_F$, the higher the front brightness. To improve a light-condensing ability, it is preferable to make $\alpha_F$ 73 degrees or larger.

On the other hand, the smaller the $\alpha_F$, the easier the manufacturing of a metal mold and the removal of a product from the metal mold when forming an optical element according to the above-mentioned method.

Figure 19:
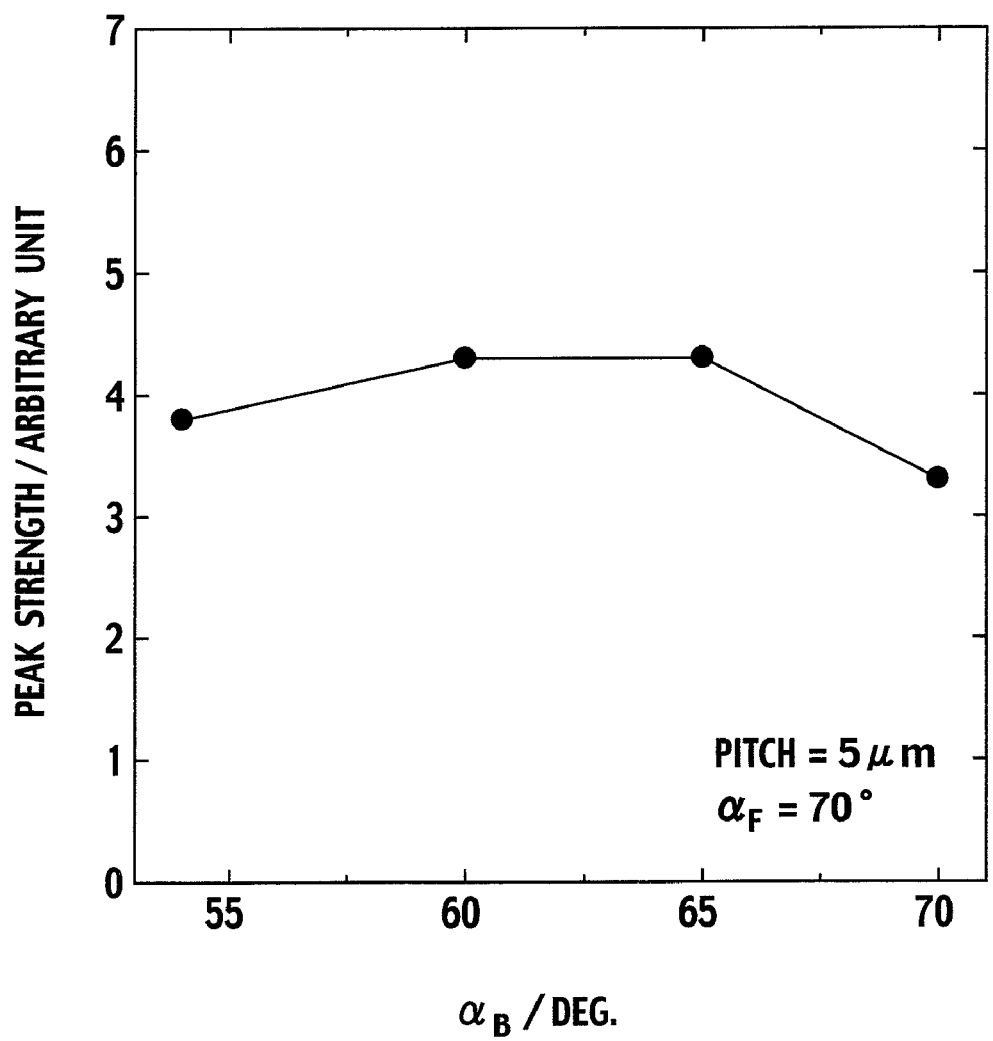
FIG. 19 shows a peak strength curve of output light from a diffraction grating having a pitch of 5 μm and $\alpha_F$ of 70° when $\alpha_B$ is changed.
Figure 20:
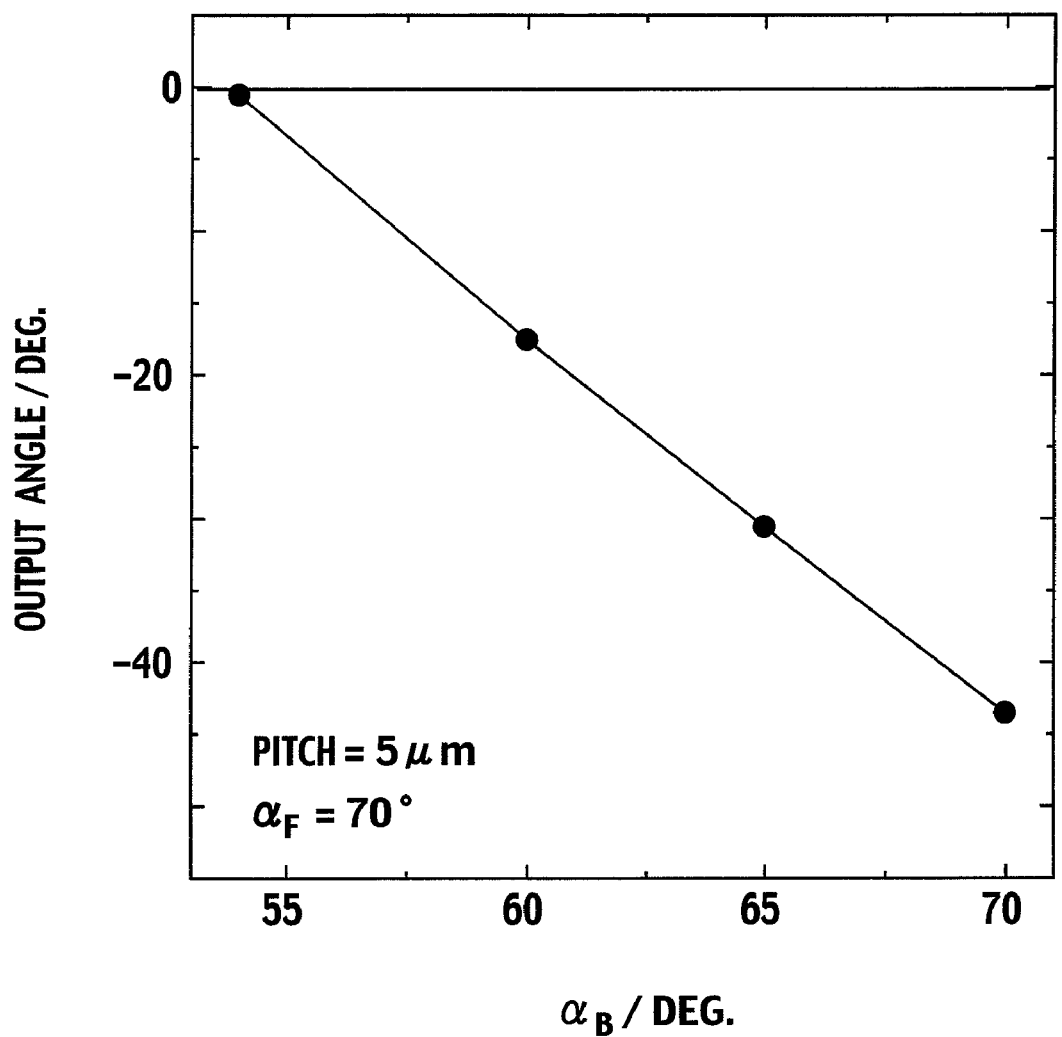
FIG. 20 shows a peak angle curve of output light from diffraction grating having a pitch of 5 μm and $\alpha_F$ of 70° when $\alpha_B$ is changed.

FIG. 19 shows a peak strength curve of output light from a diffraction grating having a pitch of 5 μm and $\alpha_F$ of 70 degrees with $\alpha_B$ being changed. Unlike the case of changing $\alpha_F$, the peak strength greatly decreases when $\alpha_B$ exceeds 65°. If $\alpha_B$ is equal to or smaller than 65°, there is substantially no $\alpha_B$ dependence. As shown in FIG. 20, the peak angle of output light greatly changes depending on $\alpha_B$. Accordingly, $\alpha_B$ must be selected so that the required peak angle of output light is obtained. With respect to a quantity of change $\delta\alpha_B$ in $\alpha_B$, a quantity of change $\delta\theta_o$ in an output light angle satisfies the following expression:

$$\delta\theta_o = -2.696\delta\alpha_B \quad (12)$$

The expression (12) suggests that, if it is necessary to change an output light peak position by +5°, the angle $\alpha_B$ may be reduced by 1.86°.

Figure 21:
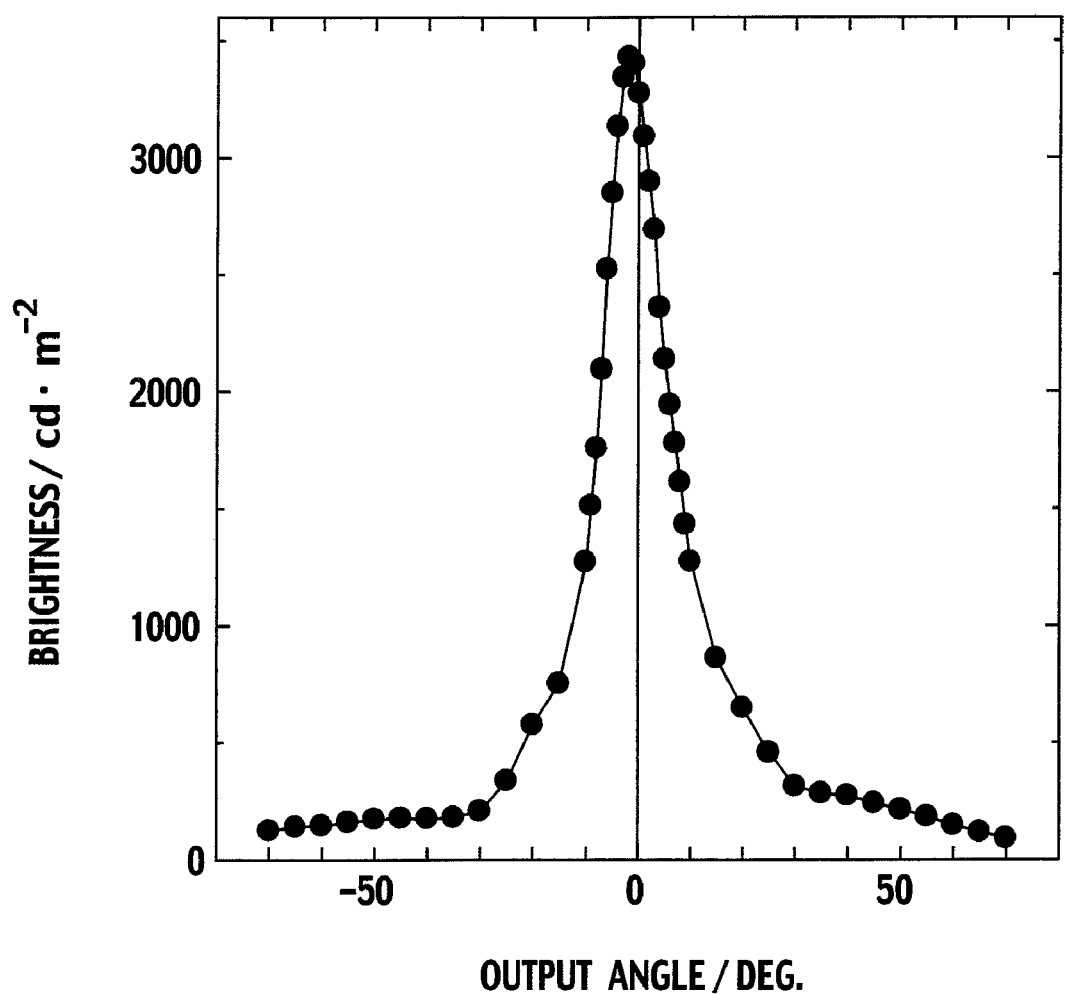
FIG. 21 shows an angular distribution of the output-light intensity when white light having the strength distribution shown in FIG. 14 is made incident to a diffraction grating having a pitch of 4 μm, $\alpha_F$ of 73.6°, and $\alpha_B$ of 55.4°.
Figure 22:
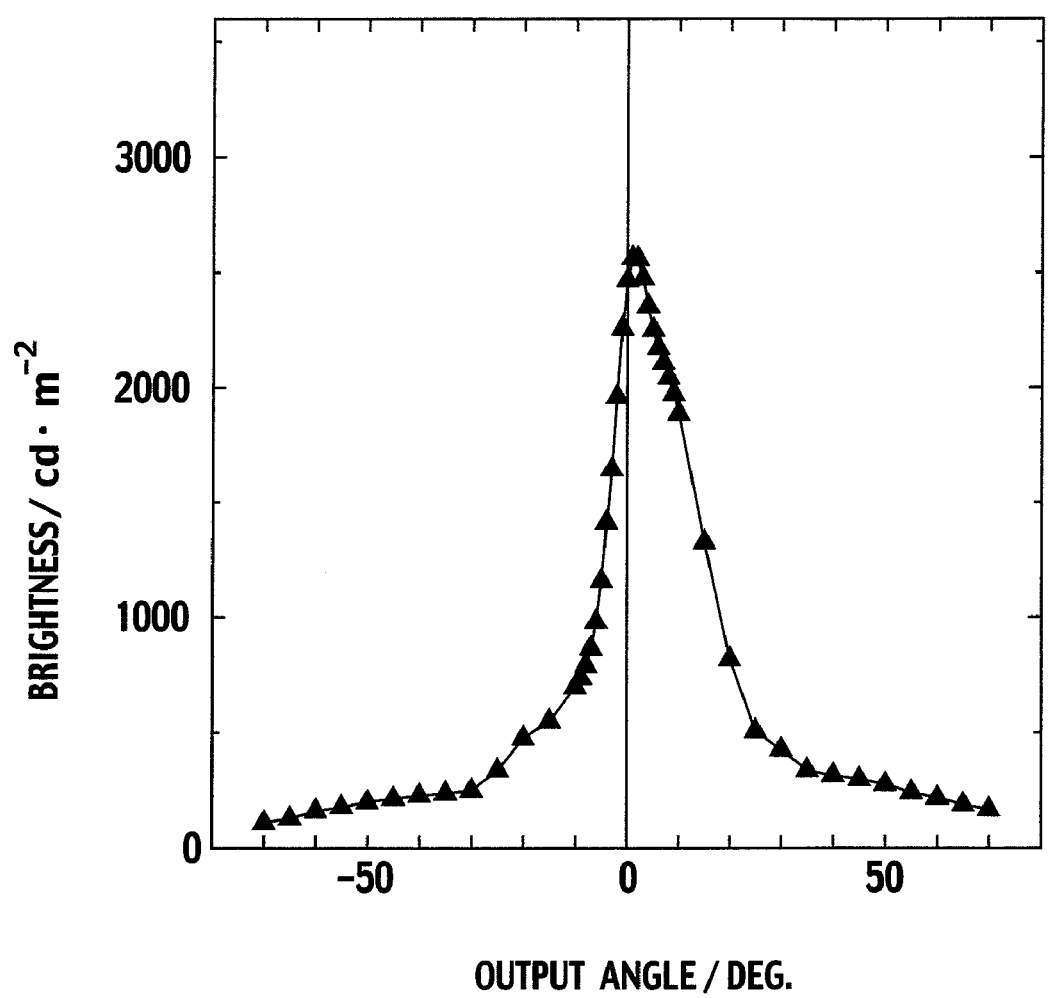
FIG. 22 shows an angular distribution of the output-light intensity when white light having the strength distribution shown in FIG. 14 is made incident to a diffraction grating having a pitch of 6 μm, $\alpha_F$ of 73.6°, and $\alpha_B$ of 55.4°.
Figure 23:
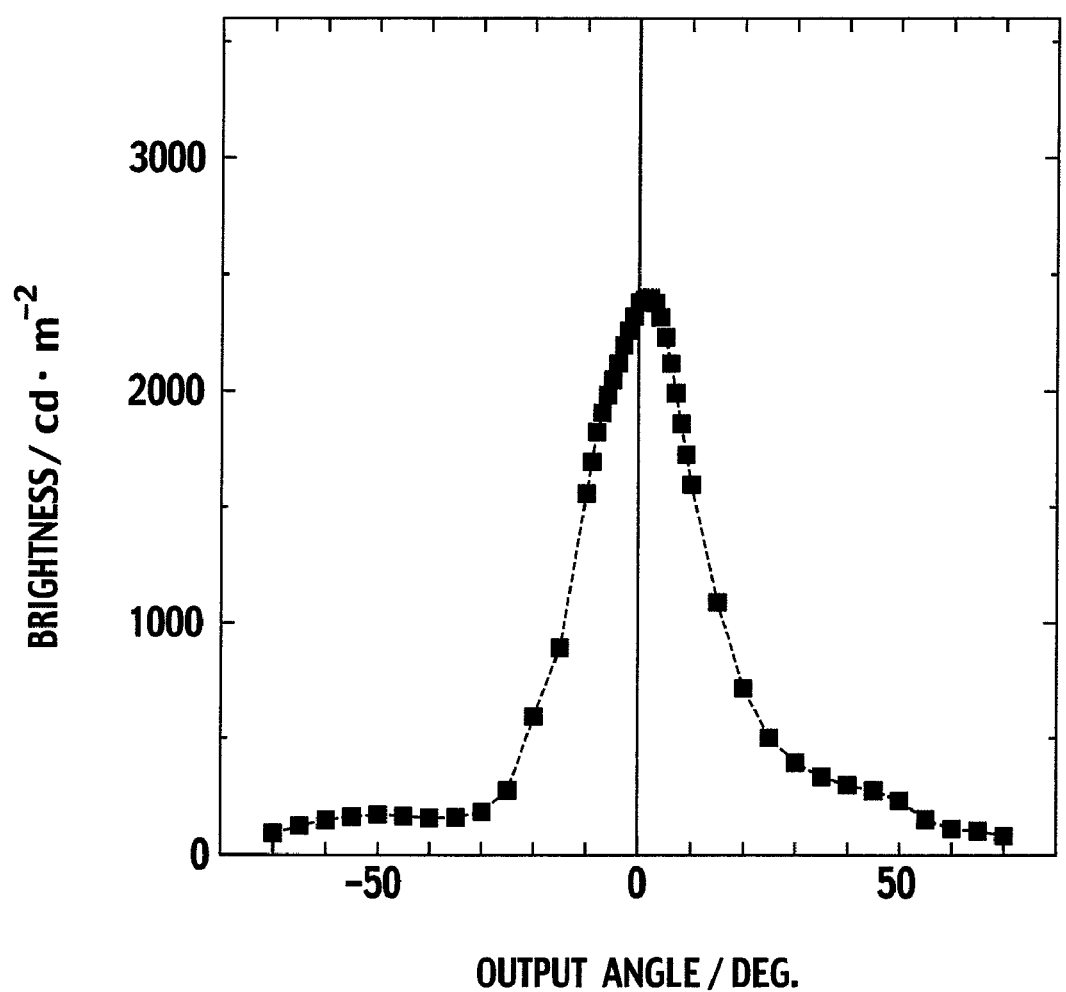
FIG. 23 shows an angular distribution of the output-light intensity when white light having the strength distribution shown in FIG. 14 is made incident to a diffraction grating having a pitch of 8 μm, $\alpha_F$ of 73.6°, and $\alpha_B$ of 55.4°.
Figure 24:
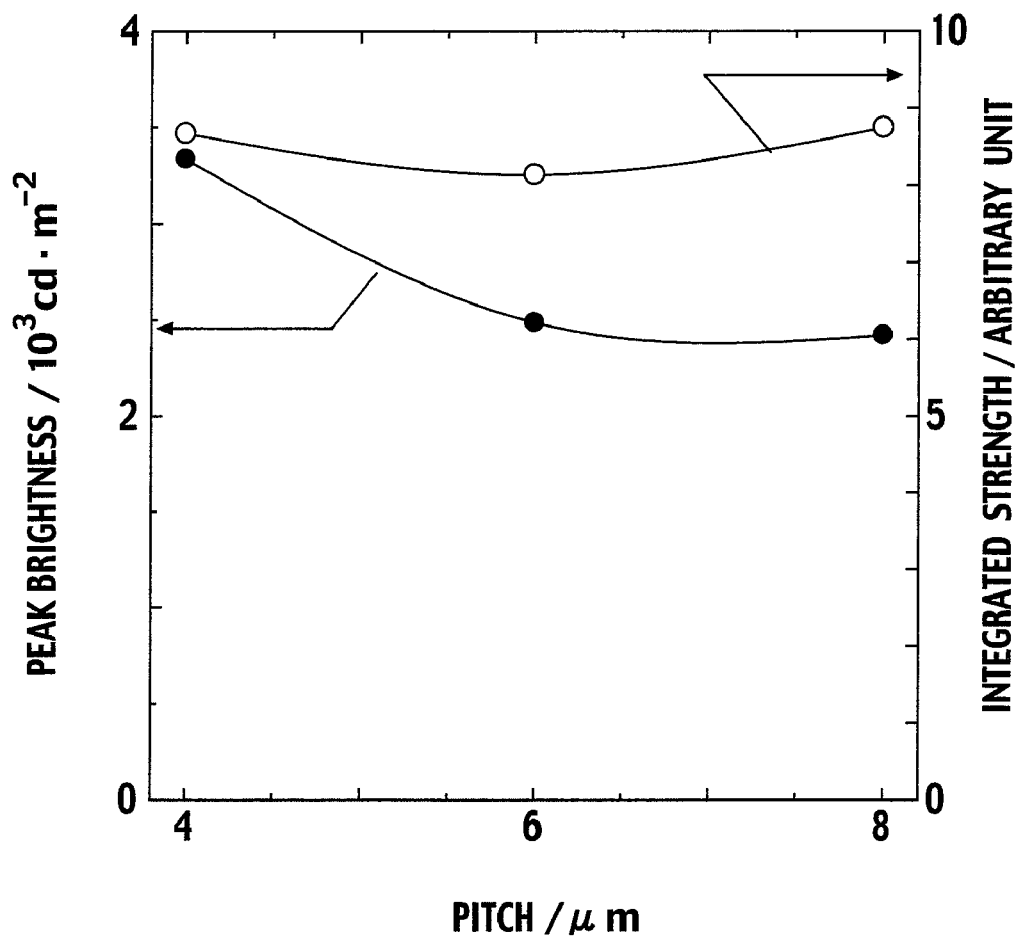
FIG. 24 shows the diffraction-grating-pitch dependence of output light peak brightness and integrated strength when white light having the strength distribution shown in FIG. 14 is made incident to a diffraction grating having $\alpha_F$ of 73.6° and $\alpha_B$ of 55.4°.
Figure 25:
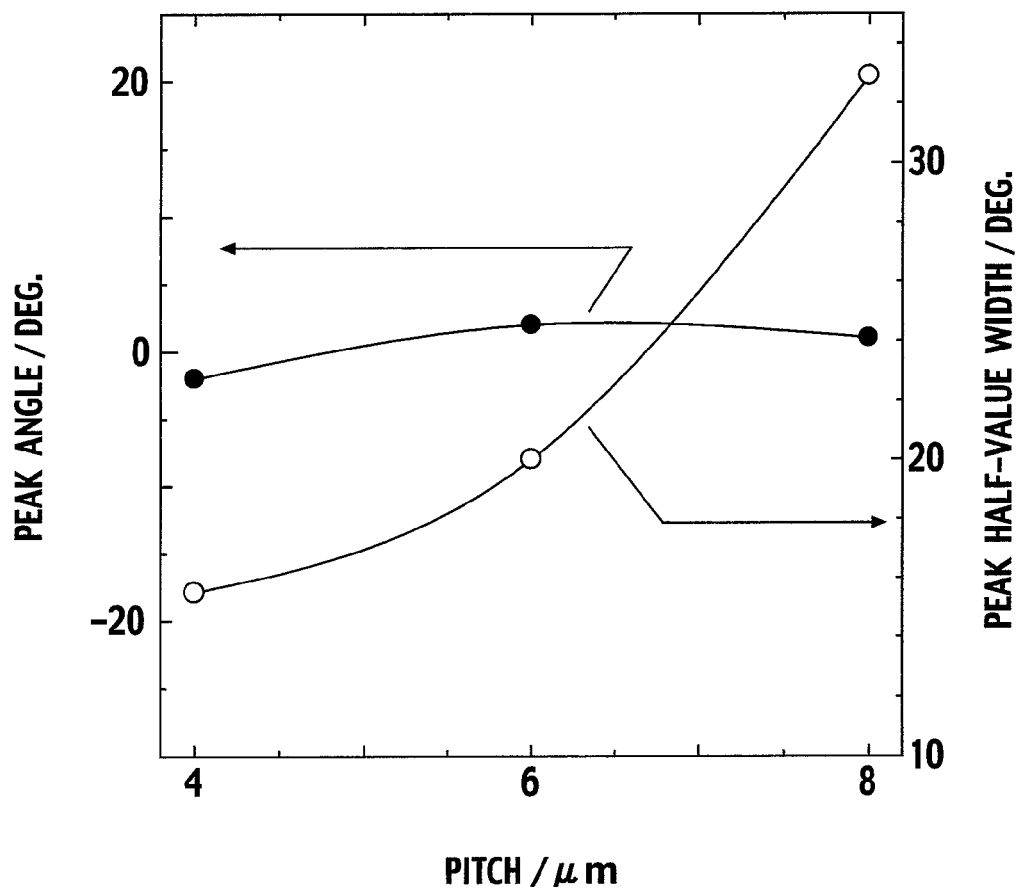
FIG. 25 shows the diffraction-grating-pitch dependence of output light peak angle and peak half-value width when white light having the strength distribution shown in FIG. 14 is made incident to a diffraction grating having $\alpha_F$ of 73.6° and $\alpha_B$ of 55.4°.
Figure 26:
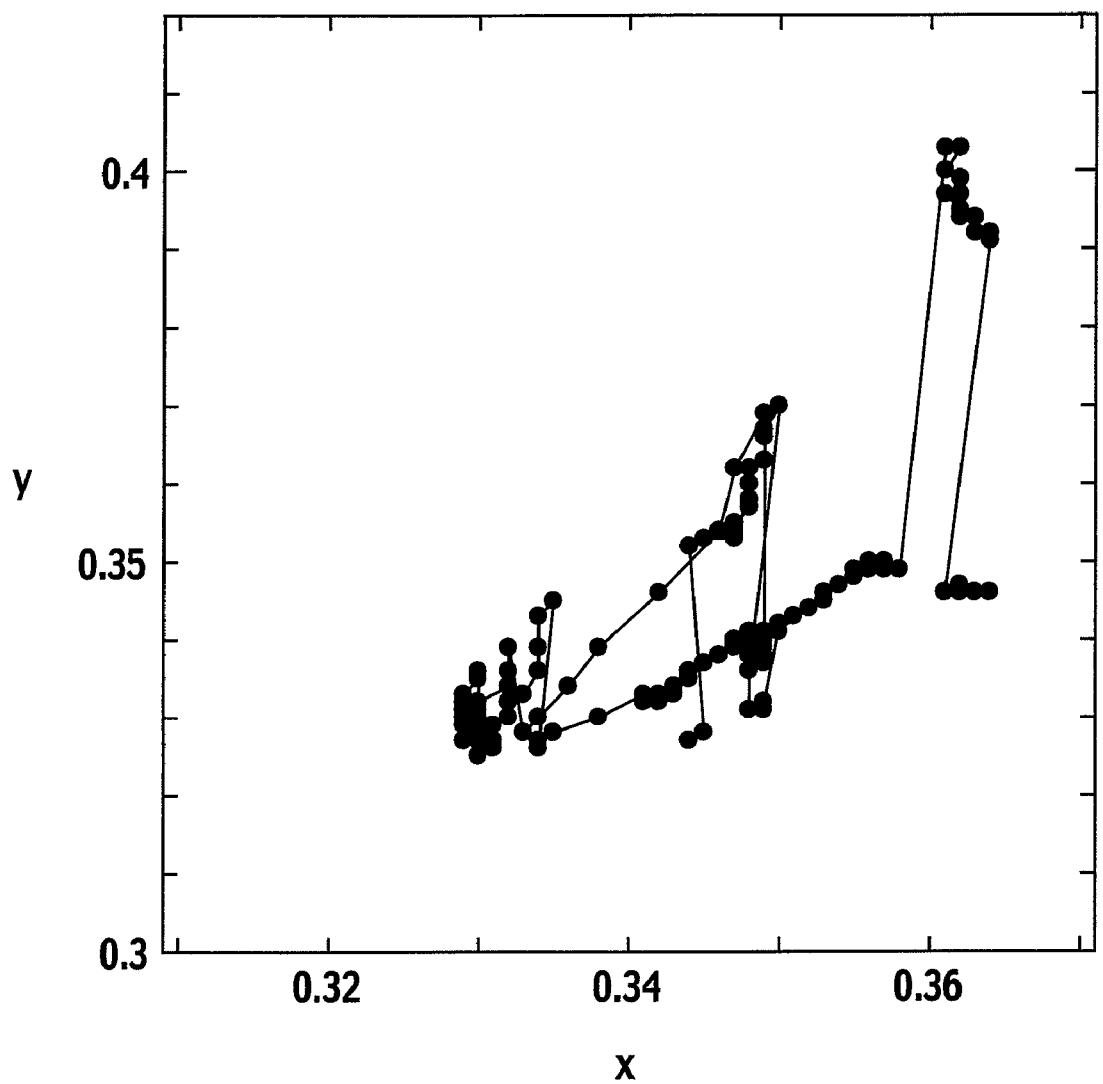
FIG. 26 shows a distribution of chromaticity coordinates when white light having the strength distribution shown in FIG. 14 is made incident to a prism sheet.
Figure 27:
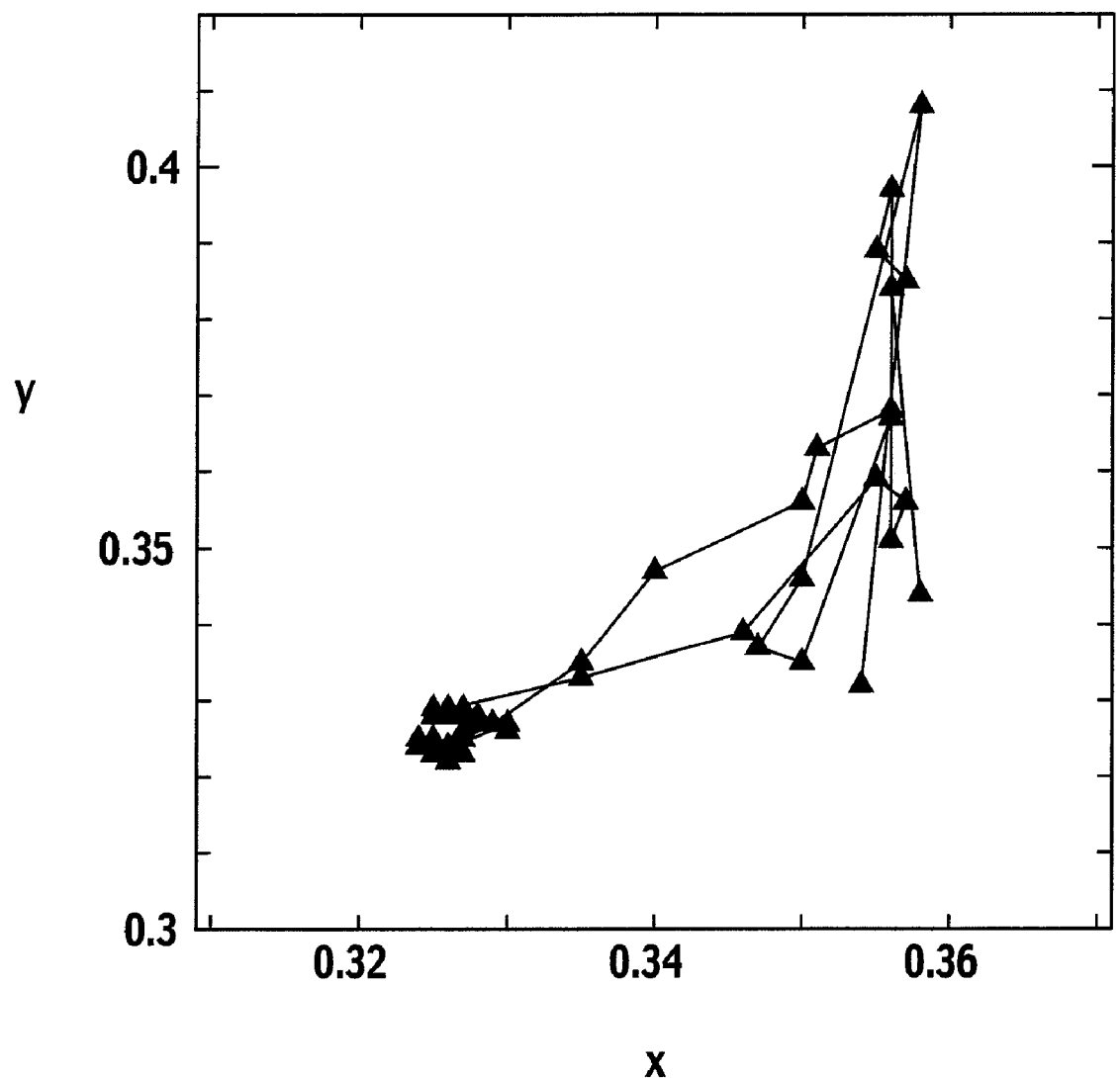
FIG. 27 shows a distribution of chromaticity coordinates when white light having the strength distribution shown in FIG. 14 is made incident to a diffraction grating having a pitch of 8 μm, $\alpha_F$ of 73.6°, and $\alpha_B$ of 55.4°.
Figure 28:
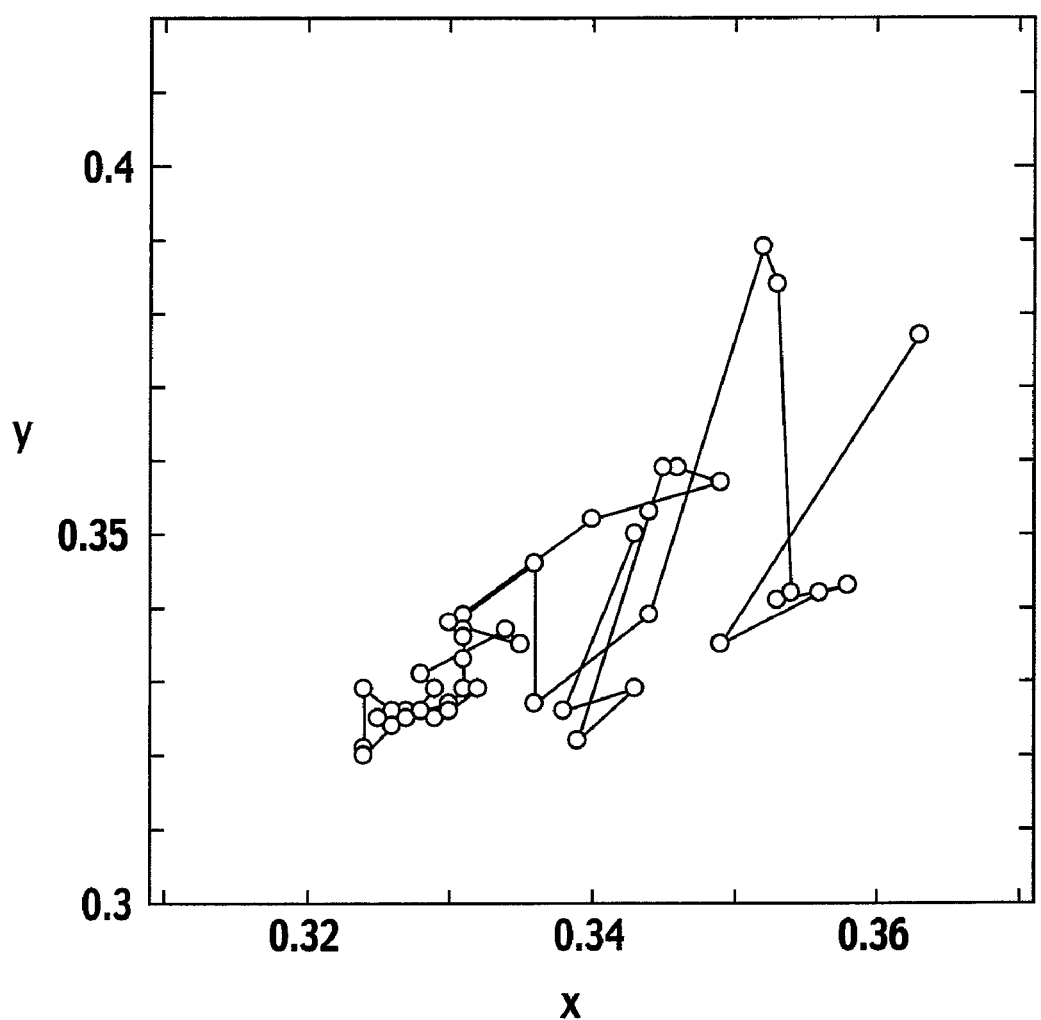
FIG. 28 shows a distribution of chromaticity coordinates when white light having the strength distribution shown in FIG. 14 is made incident to a diffraction grating having a pitch of 6 μm, $\alpha_F$ of 73.6°, and $\alpha_B$ of 55.4°.
Figure 29:
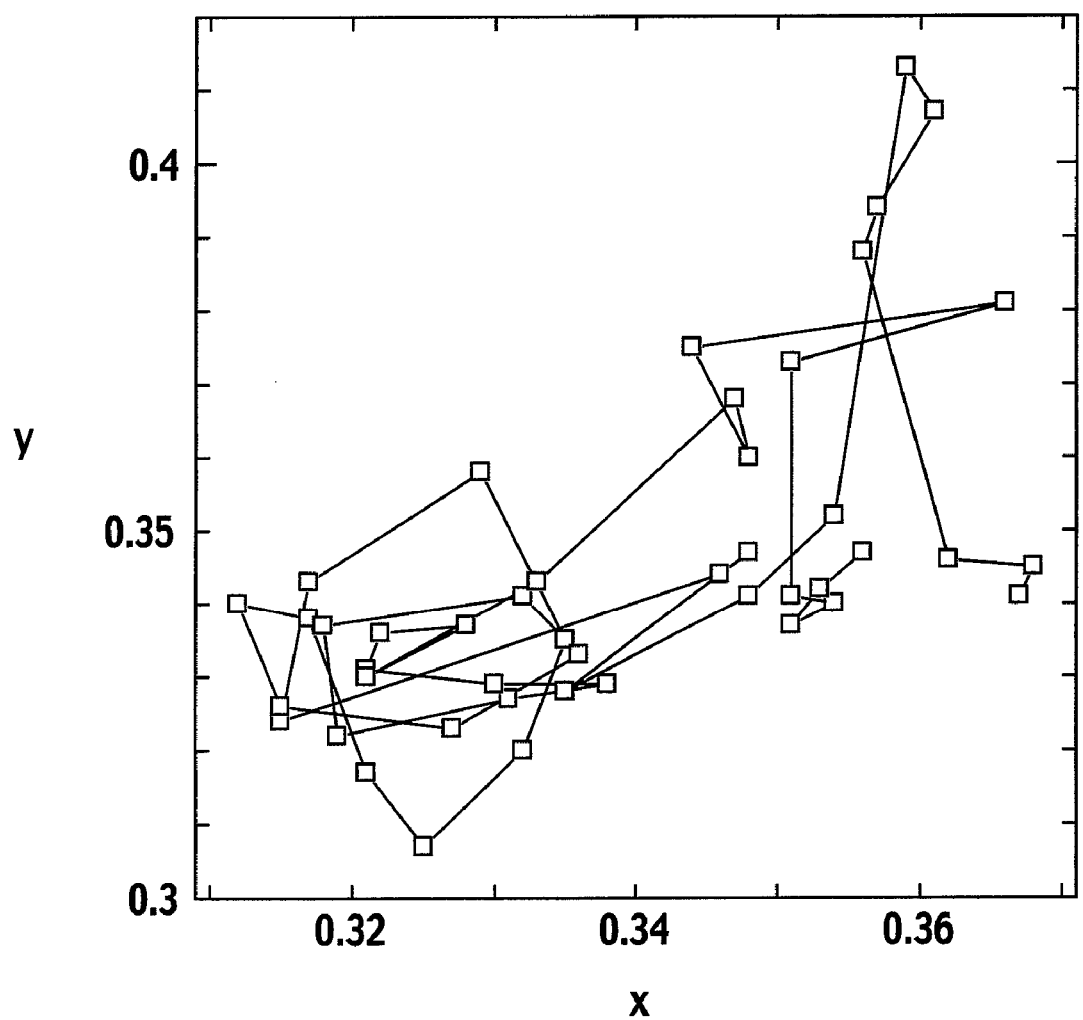
FIG. 29 shows a distribution of chromaticity coordinates when white light having the strength distribution shown in FIG. 14 is made incident to a diffraction grating having a pitch of 4 μm, $\alpha_F$ of 73.6°, and $\alpha_B$ of 55.4°.

FIGS. 21, 22, and 23 show angle distributions of output light strength of diffraction gratings having the same shape with $\alpha_F$ being 73.6° and $\alpha_B$ being 55.4° and different pitches. As is apparent from the figures, the smaller the pitch of a diffraction grating, the sharper and stronger the output light. FIG. 24 shows peak brightness and integrated strength with respect to pitches. A change in the pitch substantially causes no change in the total quantity of output light, i.e., integrated strength. However, as shown in FIG. 25, a peak half-value width becomes smaller as the pitch becomes smaller. In other words, the light-condensing ability increases to improve front peak brightness. Since there is substantially no change in the peak angle, it is understood that no consideration is needed in an influence in an output direction when the pitch is changed. To increase the light-condensing ability and improve the front brightness of the backlight, the pitch of the diffraction grating must be reduced as small as possible.

However, the smaller the pitch of a diffraction grating, the more the problem of dispersion becomes conspicuous. The size of dispersion can be evaluated as a change in color coordinates when an observation direction is changed relative to a light source. FIGS. 26 to 29 show color coordinate distributions of a prism sheet and diffraction gratings. When pitches are 6 μm and 8 μm, the ranges of color coordinate distributions of the gratings are substantially the same as the distribution of the prism sheet shown in FIG. 26. When the pitch becomes 4 μm, the distribution range becomes slightly larger than that of the prism sheet. In practice, it is preferable that the pitch of a diffraction grating is equal to or larger than 2 μm.

Figure 30:
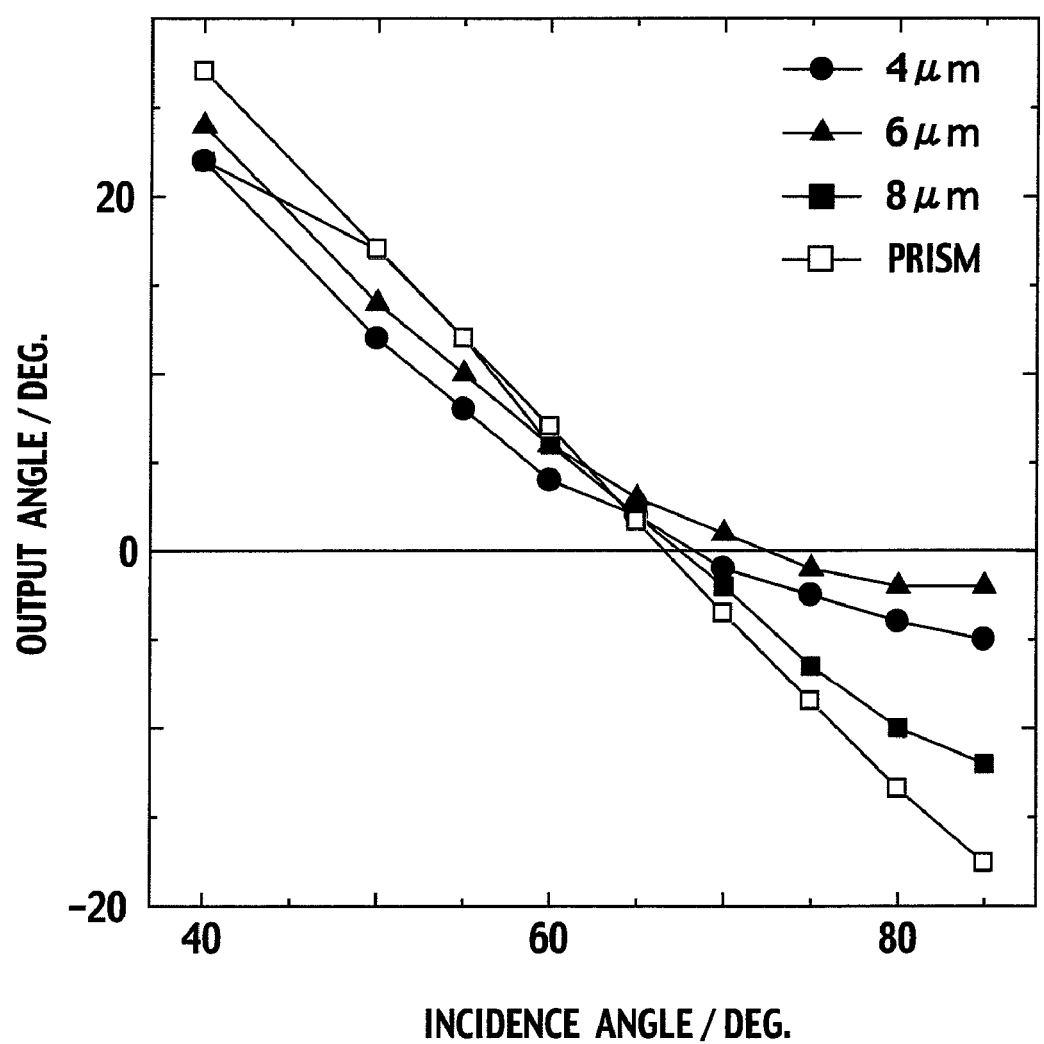
FIG. 30 shows the incident angle dependence of an output angle when white collimated light is made incident to a prism sheet and diffraction gratings having pitches of 4, 6, and 8 μm, $\alpha_F$ of 73.6°, and $\alpha_B$ of 55.4°.

The above-mentioned high light-condensing ability of the 4-μm-pitch diffraction grating is because of a characteristic of the diffraction grating that a change in an output light angle is small with respect to a change in an incident light angle. This will be explained with reference to FIG. 30. In FIG. 30, a prism sheet and diffraction gratings having pitches of 4, 6, and 8 μm, $\alpha_F$ of 73.6°, and $\alpha_B$ of 55.4° receive white collimated light (a half-value width of 3.9°), and the incident light angle dependence of an output angle is measured. A light source is a LED (NSCW335T) of Nichia Kagaku and a direct current of 15 mA is applied to the LED to emit light. Light from the light source is converted into parallel light through a convex lens and a slit. When the optical film (prism sheet) with downward-oriented prisms is used as indicated with white squares, an angular change in incident light is equal to an angular change in output light and there is no light-condensing effect. This is because the prism sheet deflects light by total reflection with the prisms. On the other hand, the diffraction gratings show a small change in an output angle with respect to a change in an incidence angle, in particular, when the incident angle is large. This tendency becomes more conspicuous as the pitch of the diffraction grating becomes smaller. Namely, the high light-condensing ability observed in the diffraction grating with a pitch of 4 μm is due to the characteristic of the diffraction grating that light is output around a specific angle without regard to an incidence angle. This advantage is unachievable with the prism sheet.

Figure 31:
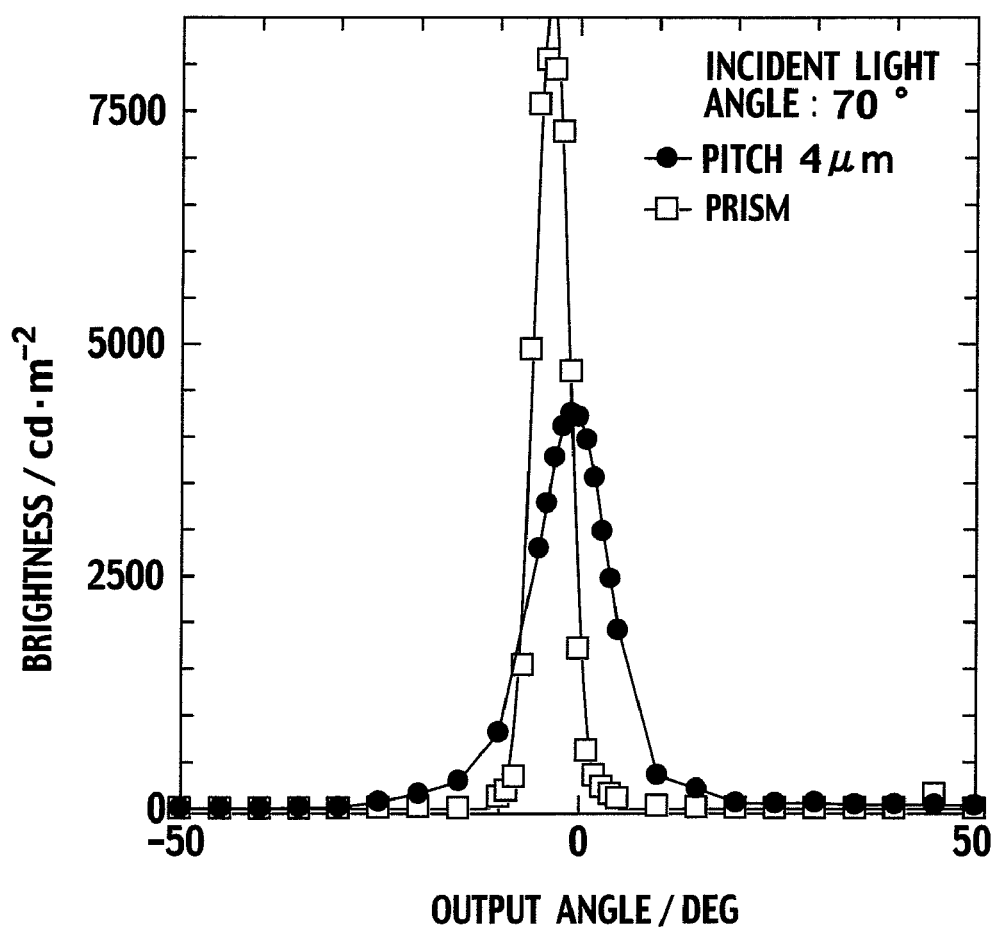
FIG. 31 shows the output angle dependence of output light intensity when a prism sheet and a diffraction grating having a pitch of 4 μm, $\alpha_F$ of 73.6°, and $\alpha_B$ of 55.4° are irradiated by collimated white light from a direction that has an angle of 70 degrees to a normal of the incidence surface and is orthogonal to the groove direction.
Figure 32:
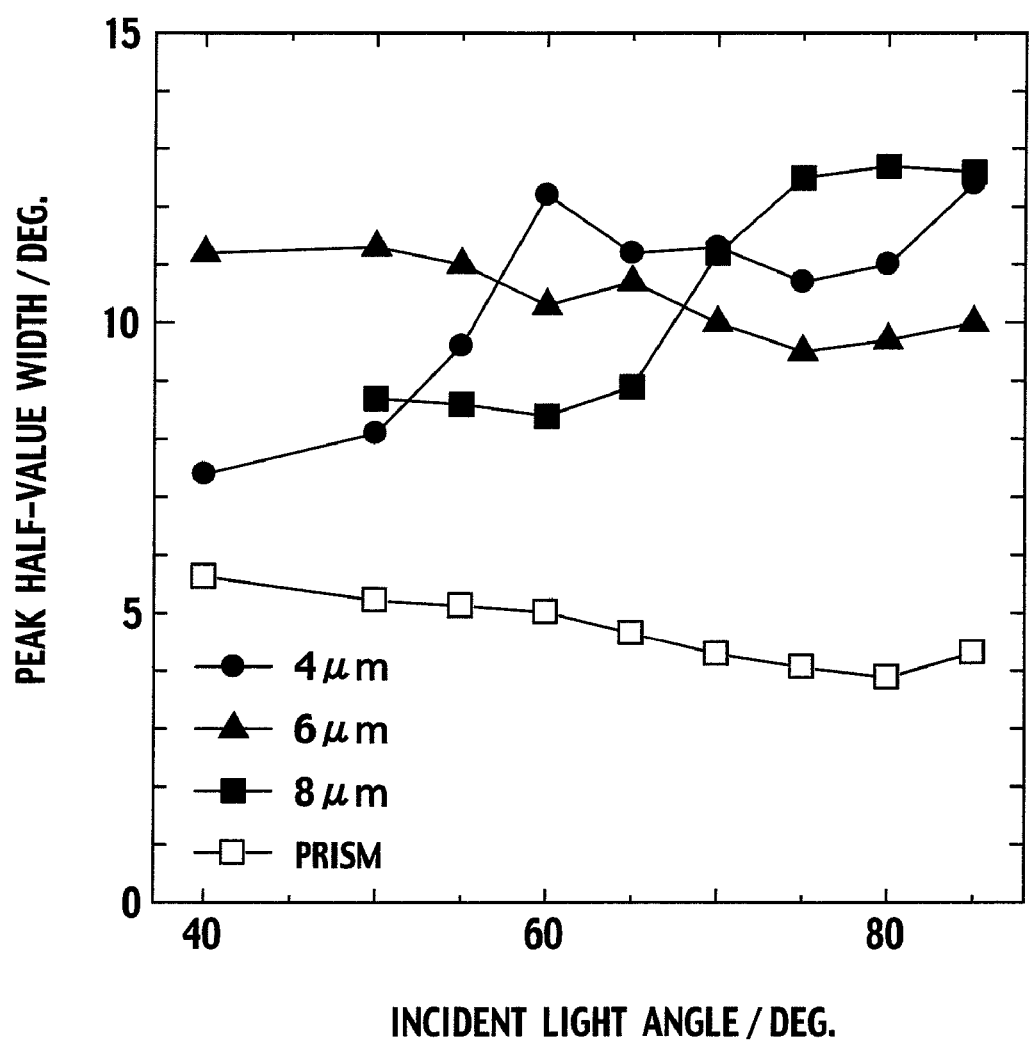
FIG. 32 shows the dependence of a peak half-value width of output light with respect to an angle between incident light and the normal of an incidence surface when a prism sheet and diffraction gratings having pitches of 4, 6, and 8 μm, $\alpha_F$ of 73.6°, and $\alpha_B$ of 55.4° are irradiated by collimated white light from a direction orthogonal to a groove direction.

On the other hand, the diffraction grating shows a diffusion effect on parallel light. FIG. 31 shows output angle distributions of output light strength obtained with the use of the same measuring device as that of FIG. 30. White collimated light (a half-value width of 3.9°) is made incident at an angle of 70° to the normal of an incidence surface to a prism sheet and a diffraction grating having a pitch of 4 μm, $\alpha_F$ of 73.6°, and $\alpha_B$ of 55.4°. The prism sheet refracts light by refraction and total reflection, and therefore, the directivity of output light is substantially equal to that of incident light (a half-value width of 4.3°). In the case of the diffraction grating, the output light has a larger peak width (a half-value width of 11.3°) due to diffracted rays. FIG. 32 shows a half-value width of output light peak and an angle of incident light to a normal of an incidence surface. Irrespective of the angle of incident light, the diffraction gratings show a higher diffusion ability for parallel light than the prism sheet.

Figure 33:
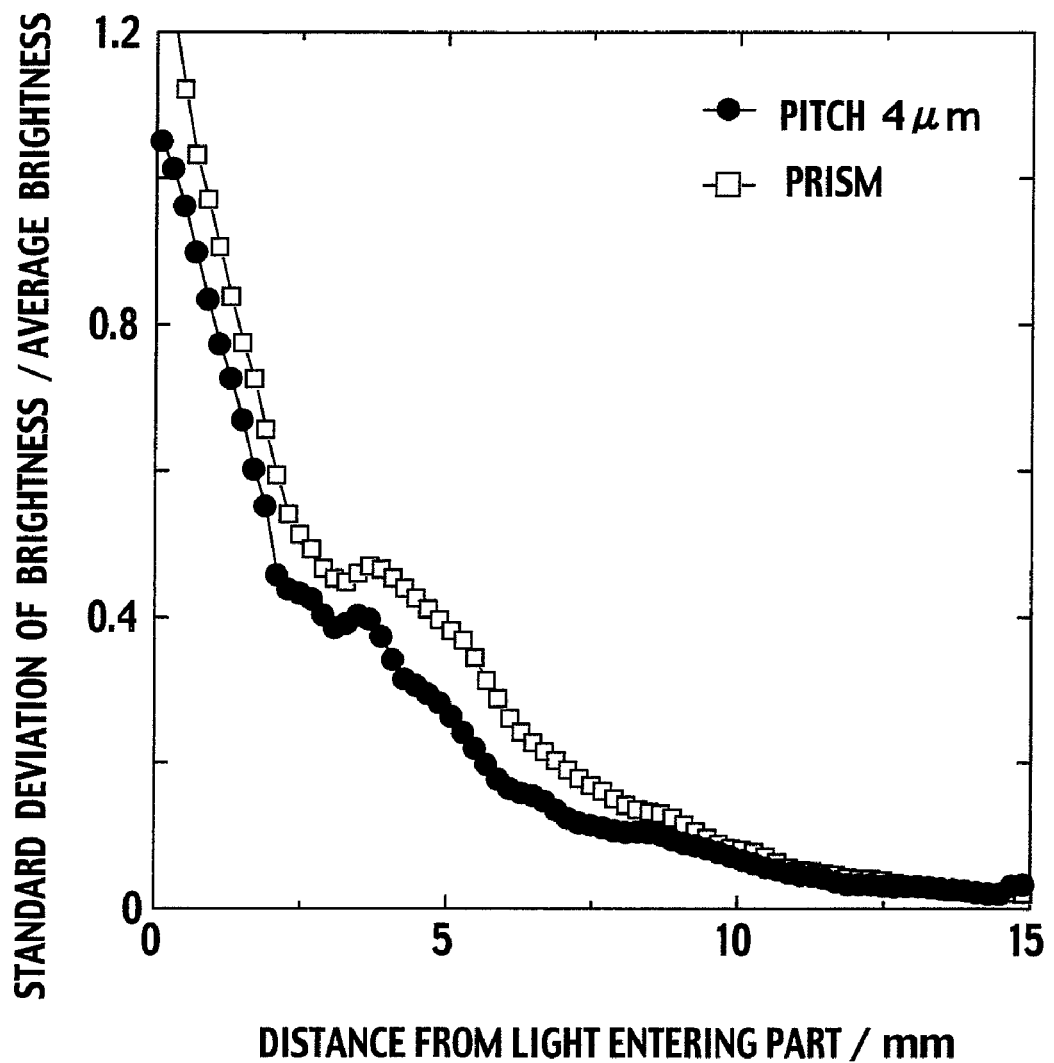
FIG. 33 shows a change in brightness nonuniformity, quantified as the ratio of the standard deviation of brightness to average brightness, with respect to a distance from a light entering part when a prism sheet and a diffraction grating having a pitch of 4 μm, $\alpha_F$ of 73.6°, and $\alpha_B$ of 55.4° are arranged on a side incidence type backlight having the strength distribution shown in FIG. 14.

The light-diffusion ability of a diffraction grating appears as an effect of reducing brightness nonuniformity when it is used in a backlight. FIG. 33 shows brightness nonuniformity measured with respect to a distance from a light entering part where a LED is arranged in the backlight unit shown in FIG. 13. The measurement was made with RISA COLOR/CD7 of HI-LAND and observation was made from a normal direction of the output surface of the backlight unit. An area of 15 mm×15 mm from the light entering part was divided into 0.15 mm×0.15 mm sections and a brightness distribution was measured for spots equally distanced from the light entering part. The ratio of a standard deviation of the brightness distribution to an average brightness was regarded as brightness nonuniformity. For comparison, a sample using a prism sheet instead of the diffraction type light-condensing film of FIG. 13 was also measured.

As shown in FIG. 33, compared with the conventional prism sheet, the diffraction grating shows smaller brightness nonuniformity. Accordingly, using the diffraction type light-condensing film can reduce a "frame area" around a light entering part and help minimizing the size of a backlight unit.

In this way, the diffraction grating of the present invention can be used for a light-condensing film of a planar light source device, to simultaneously realize increased front brightness and minimized brightness nonuniformity.

The invention claimed is

1. A transmission diffraction grating having a film or plate shape, the diffraction grating having an incidence surface to receive incident light and an output surface to transmit and output the incident light, the incidence surface having fine grating grooves that are parallel to one another and form a sawteeth sectional shape, when receiving white light having CIE color coordinates of x=0.310 and y=0.316, the diffraction grating providing output light having a CIE color coordinate x of $0.31 \leqq x \leqq 0.37$ and a color coordinate y of $0.3 \leqq y\ 0.42$, bending white light obliquely made incident to the diffraction grating to a vertical direction with suppressed dispersion and outputting the bent light, thereby realizing a light-condensing ability that a change in an output light angle is smaller than a change in an incident light angle, a normal of one of the slopes of a sawtooth forming an angle $\alpha_F$ with a normal of a top surface of the film or plate so that the angle $\alpha_F$ is equal to or larger than 70 degrees and equal to or smaller than 89.5 degrees, and a normal of the other slope forming an angle $\alpha_B$ with respect to the normal of the top surface of the film or plate to satisfy $\theta_i/2.69-5 \leqq 78-\alpha_B \leqq \theta_i/2.69+5$, where $\theta_i$ is an angle formed between incident light and the normal of the top surface of the film or plate.

2. The transmission diffraction grating as set forth in claim 1, wherein $\alpha_F$ is equal to or larger than 730° and equal to or smaller than 81°.

3. The transmission diffraction grating as set forth in claim 1, wherein a pitch is equal to or smaller than 10 μm.

4. The transmission diffraction grating as set forth in claim 3, wherein the pitch is equal to or larger than 1 μm and equal to or smaller than 5 μm.

5. The transmission diffraction grating as set forth in claim 1, wherein the grating has a surface shape with a sawteeth shape approximated by N levels (N=4, 5, 6, 7, 8, . . . ).

6. The transmission diffraction grating as set forth in claim 1, wherein the grating grooves are formed in circular arcs.

7. The transmission diffraction grating as set forth in claim 1, wherein, with $m_1$, $m_2$=1, 2, 3, . . . , the surface has a sawteeth shape having an average period d of $m_1 \times (6.0 \pm 2.0)$ μm and an average depth h of $m_2 \times (5.0 \pm 1.0)$ μm, or a surface shape with the sawteeth shape approximated by N levels (N=4, 5, 6, 7, 8, . . . ).

8. The transmission diffraction grating as set forth in claim 1, wherein a film having a function of preventing polarization split, color separation, or reflection is arranged adjacent to the transmission diffraction grating, or on the front and back sides of a hologram optical element.

9. The transmission diffraction grating as set forth in claim 8, wherein the function of preventing polarization split, color separation, or reflection is provided by a relief grating having a period equal to or smaller than 0.6 μm and a depth equal to or smaller than 0.5 μm.

10. A planar light source device comprising the transmission diffraction grating as set forth in claim 1 arranged on a light output surface of a planar light source.

11. The planar light source device as set forth in claim 10, wherein, if no transmission diffraction grating is arranged, light is output in an angular range of 20° to 70° with respect to a normal direction of the light output surface of the planar light source, and if a hologram optical element serving as a transmission diffraction grating is arranged, 60% or over of whole output light from the planar light source is output in an angular range of −10° to +10° with respect to the normal direction of the light output surface of the planar light source.

12. The planar light source device as set forth in claim 10, wherein a diffuser is used in addition to the hologram optical element.

13. The planar light source device as set forth in claim 12, wherein the diffuser is a hologram diffuser to limitedly diffuse incident light into a specific angular range in a space.

14. The planar light source device as set forth in claim 13, wherein the hologram diffuser is integrally formed on a light output surface of a light guide.

15. The planar light source device as set forth in claim 10, wherein a reflection preventive film is arranged on the light output surface of the hologram optical element.

16. The planar light source device as set forth in claim 10, wherein a film for polarization or wavelength selection is also arranged.

17. The planar light source device as set forth in claim 10, wherein a light source of the planar light source is arranged in contact with a side end face of the light guide and a plurality of grooves are formed on the back surface of the light guide substantially orthogonal to a light propagating direction of the light guide.

* * * * *